United States Patent
Tokunaga

(10) Patent No.: US 9,578,482 B2
(45) Date of Patent: Feb. 21, 2017

(54) COMMUNICATION APPARATUS AND METHOD OF CONTROLLING THE SAME

(71) Applicant: CANON KABUSHIKI KAISHA, Tokyo (JP)

(72) Inventor: Koshi Tokunaga, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 231 days.

(21) Appl. No.: 14/347,706

(22) PCT Filed: Nov. 22, 2012

(86) PCT No.: PCT/JP2012/081015
§ 371 (c)(1),
(2) Date: Mar. 27, 2014

(87) PCT Pub. No.: WO2013/081084
PCT Pub. Date: Jun. 6, 2013

(65) Prior Publication Data
US 2014/0226530 A1  Aug. 14, 2014

(30) Foreign Application Priority Data

Dec. 2, 2011 (JP) ................................. 2011-265312

(51) Int. Cl.
*H04W 8/00* (2009.01)
*H04L 12/24* (2006.01)

(52) U.S. Cl.
CPC .......... *H04W 8/005* (2013.01); *H04L 41/0809* (2013.01)

(58) Field of Classification Search
None
See application file for complete search history.

(56) References Cited

U.S. PATENT DOCUMENTS 7,821,955 B2  10/2010  Morikuni et al.
2004/0102977 A1*  5/2004  Metzler .................. G10L 15/22
                                                      704/275

(Continued)

FOREIGN PATENT DOCUMENTS

JP   2004-328271 A   11/2004
JP   2006-067231 A    3/2006

(Continued)

OTHER PUBLICATIONS

The above patent documents were cited in an Office Action dated Dec. 4, 2015, that issued in a related U.S. Appl. No. 14/347,416.

*Primary Examiner* — Hassan Kizou
*Assistant Examiner* — Roberta A Shand
(74) *Attorney, Agent, or Firm* — Cowan, Liebowitz & Latman, P.C.

(57) ABSTRACT

This invention relates to a communication apparatus capable of facilitating a connection with a device in a network by using a discovery protocol for discovering a device in a network. After selecting a device based on pieces of device information transmitted from devices in the network in response to a search command to search devices in the network, the communication apparatus transmits a notification signal to notify devices in the network of the presence of the communication apparatus. If a connection request received from a device which has received the notification signal is one transmitted from the selected device, the communication apparatus transmits a response representing that connection is accepted for the connection request.

13 Claims, 17 Drawing Sheets

(56) References Cited

U.S. PATENT DOCUMENTS

| | | | | |
|---|---|---|---|---|
| 2005/0099982 A1* | 5/2005 | Sohn | .................... | H04L 12/2803 370/338 |
| 2006/0168320 A1 | 7/2006 | Kidd et al. | | |
| 2006/0235987 A1 | 10/2006 | Goto et al. | | |
| 2008/0159162 A1* | 7/2008 | Morikuni | ............ | H04L 12/2809 370/252 |
| 2008/0288440 A1* | 11/2008 | Monni | ............... | G06F 17/30864 |
| 2009/0248713 A1* | 10/2009 | Park | .................... | H04L 67/1095 |
| 2011/0161480 A1* | 6/2011 | Kim | .................... | H04L 12/2809 709/223 |
| 2011/0314192 A1* | 12/2011 | Ahn | .................... | H04L 12/2809 710/63 |

FOREIGN PATENT DOCUMENTS

| | | |
|---|---|---|
| JP | 2006-108899 A | 4/2006 |
| JP | 2006-295504 A | 10/2006 |
| JP | 2007-060631 A | 3/2007 |
| JP | 2011-049857 A | 3/2011 |

* cited by examiner

F I G. 2
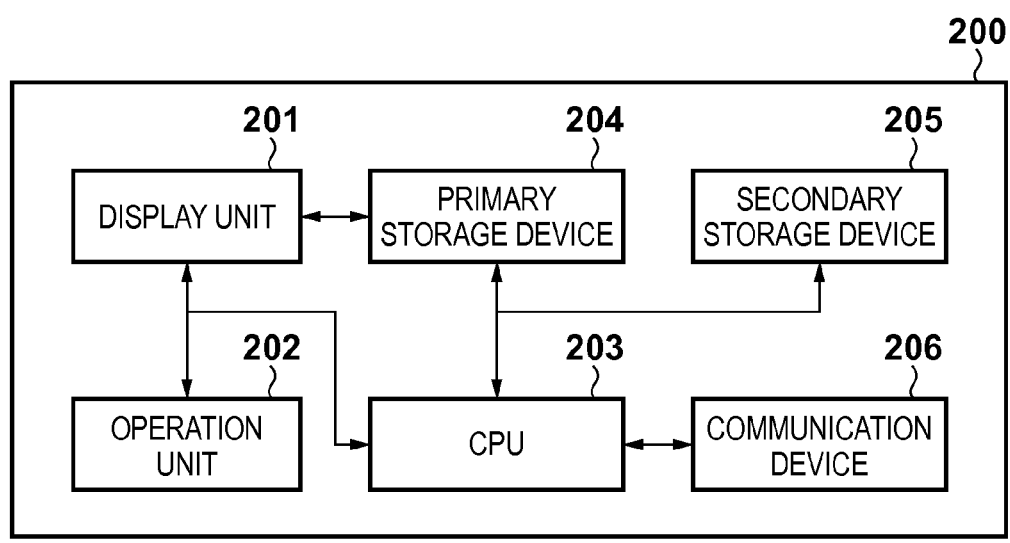

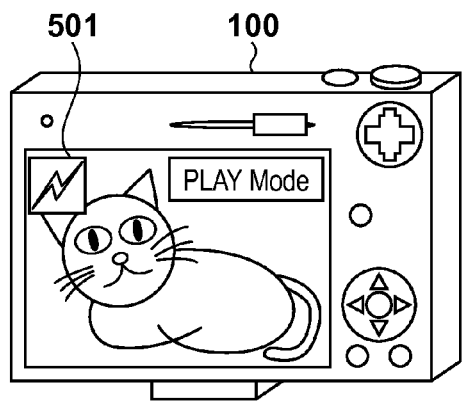
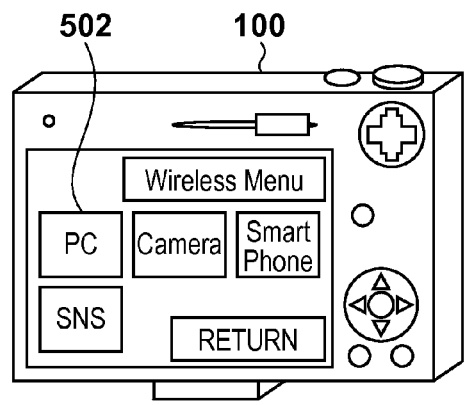
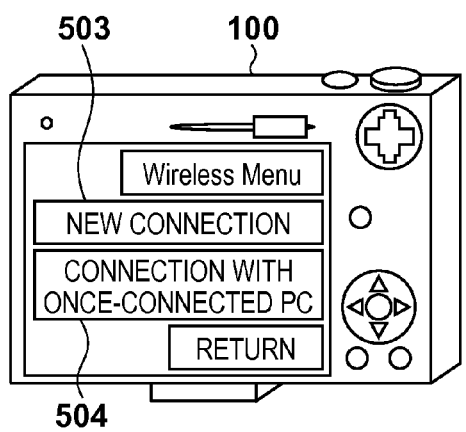
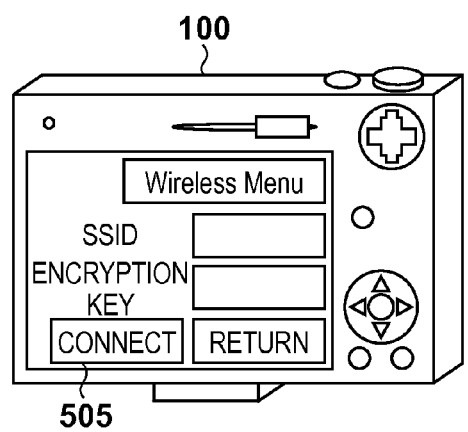
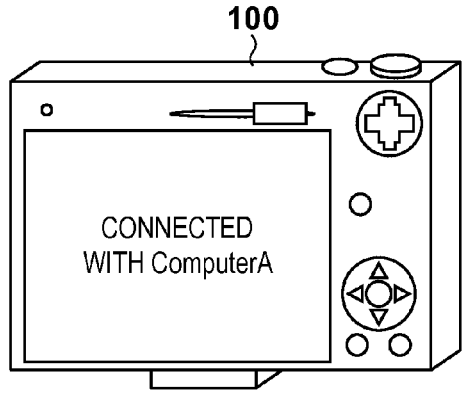

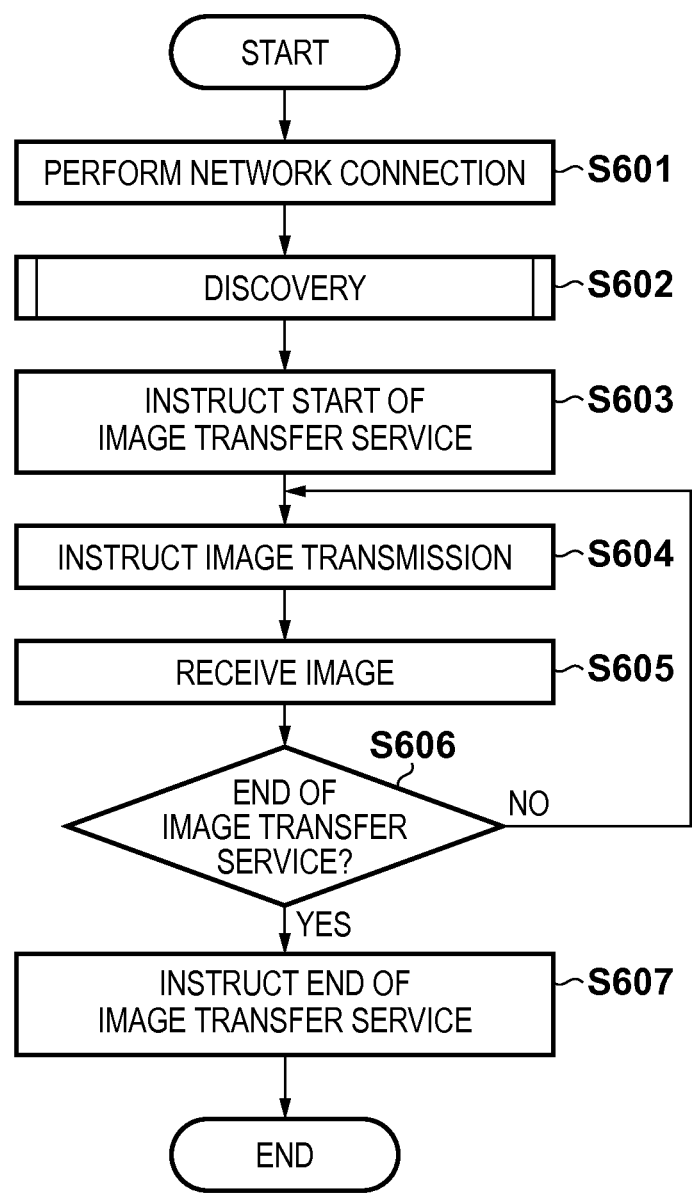
F I G. 6

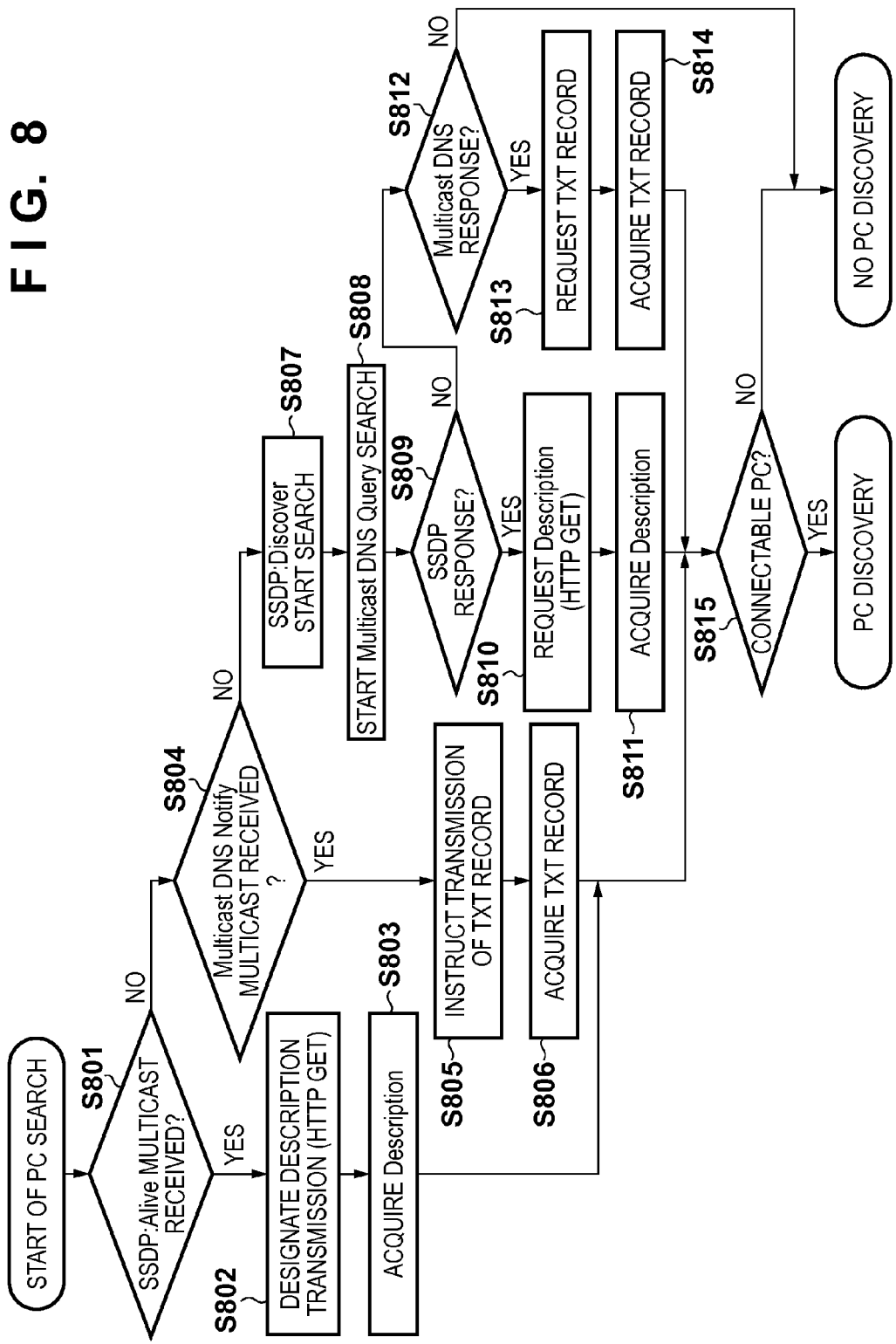

FIG. 10A

Advertisement

```
NOTIFY*HTTP/1.1
HOST:235.255.255.250:1900
CHACHE-CONTROL:max-age=1800
LOCATION:http://192.168.0.20:52602
NT:Urn:schemas-upnp-org:device:MediaServer:1
NTS:ssdp:alive
SERVER:AABBCC-Dindows-NT/6.1
```

FIG. 10B

M-Search

```
M-Search*HTTP/1.1
HOST:235.255.255.250:1900
ST:Urn:schemas-upnp-org:device:MediaServer:1
MAN:"ssdp:discover"
MX:10
```

FIG. 10C

Response

```
HTTP/1.1 200 OK
ST:Urn:schemas-upnp-org:device:MediaServer:1
LOCATION:http://192.168.0.20:52602
SERVER:AABBCC-Dindows-NT/6.1
```

FIG. 11A

Description PROVIDED FROM PC TO NETWORK-CONNECTED DEVICE

```
<?xml version="1.0"?>
<root xmlns="urn:schemas-upnp-org:device-1-0">
<specVersion>
 <major>1</major>
 <minor>0</minor>
</specVersion>
<device>
 <UDN>uuid:12345678-1234-1234-1234-123456789ABC</UDN>
 <friendlyName>Computer A</friendlyName>
 <deviceType>urn:schemas-upnp-org:device:MediaServer:1</deviceType>
 <manufacturer>Hoge</manufacturer>
 <manufacturerURL>http://www.Hoge.com</manufacturerURL>
 <modelName>Dimmer1.0</modelName>
 <modelNumber>1-00-00</modelNumber>
 <modelURL>http://www.AABBCC.com/</modelURL>
 <serialNumber>0000001</serialNumber>
 <UDN>RootDevice</UDN>
 <UPC>00000-00001</UPC>
 <serviceList>
  <service>
   <serviceType>urn:schemas-upnp-org:service:ImageTransferService:1</serviceType>
   <serviceId>urn:upnp-org:serviceId:ImageTransferService:1</serviceId>
   <controlURL/>
   <eventSubURL/>
   <SCPDURL>/ImageTransferService.xml</SCPDURL>
  </service>
 </serviceList>
</device>
</root>
```

FIG. 11B

Description PROVIDED FROM DIGITAL CAMERA TO NETWORK-CONNECTED DEVICE

```
<?xml version="1.0"?>
<root xmlns="urn:schemas-upnp-org:device-1-0">
<specVersion>
 <major>1</major>
 <minor>0</minor>
</specVersion>
<URLBase>http://192.168.0.10:49152/upnp/</URLBase>
<device>
 <deviceType>urn:hoge-com:deviced:ptp:1</deviceType>
 <friendlyName>Ganon PXY</friendlyName>
 <manufacturer>Ganon</manufacturer>
 <manufacturerURL>http://www.ganon.com</manufacturerURL>
 <modelDescription>Ganon Digital Camera</modelDescription>
 <modelName>Ganon PXY</modelName>
 <UDN>uuid:00000000-0000-0000-FFFF-123456789ABC</UDN>
 <serviceList>
  <service>
   <serviceType>urn:hoge-com:service:ptpService:1</serviceType>
   <serviceId>urn:hoge-com:serviceId:ptpServiceId</serviceId>
   <SCPDURL>CameraSvcDesc.xml</SCPDURL>
   <controlURL>ptpServiceControl</controlURL>
   <eventSubURL></eventSubURL>
  </service>
 </serviceList>
<presentationURL></presentationURL>
</device>
</root>
```

FIG. 12A

ServiceType AND TXT RECORD PROVIDED FROM PC TO NETWORK-CONNECTED DEVICE

| Service Type | _ptp-init | |
|---|---|---|
| | Key | Value |
| TXT RECORD | Version | 2.0 |
| | Model | PXY |
| | Manufacturer | Ganon |
| | Product | Ganon Digital Camera |
| | Service Available | 0 |
| | GUID | 12341234-1234-1234-1234-123412341234 |

FIG. 12B

ServiceType AND TXT RECORD PROVIDED FROM DIGITAL CAMERA TO NETWORK-CONNECTED DEVICE

| Service Type | _ptp | |
|---|---|---|
| | Key | Value |
| TXT RECORD | Version | 2.0 |
| | Model | PXY |
| | Manufacturer | Ganon |
| | Product | Ganon Digital Camera |
| | Service Available | 0 |
| | GUID | ABCDABCD-ABCD-ABCD-ABCD-ABCDEFABCDEF |
| | Target GUID | 12341234-1234-1234-1234-123412341234 |

PAIRING INFORMATION

| Key | Value |
|---|---|
| PC Name | Computer A |
| PC GUID | 12345678-1234-1234-1234-123456789ABC |
| Discovery Protocol | UPnP |
| IP Address | 192.168.0.20 |
| SSID | ABC-WIRELESS |
| Security Key | ABCNETWORKSKEY |

…

COMMUNICATION APPARATUS AND METHOD OF CONTROLLING THE SAME

TECHNICAL FIELD

The present invention relates to a communication apparatus and, more particularly, to a communication apparatus which establishes a connection with a device in a network.

The present invention also relates to a method of controlling the communication apparatus.

BACKGROUND ART

Recently, digital cameras incorporating a wireless communication function and recording media equipped with a wireless communication function have made their debut. By using these devices, an image file obtained by a digital camera can be quickly transmitted to a personal computer (to be referred to as a PC hereinafter).

However, to connect to a specific PC on a network when wirelessly connecting to a PC, information for specifying the destination PC needs to be registered in a digital camera. To solve this problem, the following digital camera has been proposed (Japanese Patent Laid-Open No. 2006-67231). More specifically, when wirelessly connecting a digital camera and PC, the digital camera is connected to the target PC via a USB cable, and pairing information for specifying the communication partner PC is set in advance in the digital camera. When the start of wireless connection is instructed, the digital camera executes advertisement to the network and establishes a wireless connection with the specific PC based on the set pairing information.

Before establishing a wireless connection, the digital camera disclosed in Japanese Patent Laid-Open No. 2006-67231 needs to be connected to a communication partner PC via a USB cable and set in advance pairing information for specifying it, resulting in poor usability.

Depending on the installed OS, the PC has a different discovery protocol used in connection processing between devices. Typical discovery protocols are UPnP (Universal Plug and Play) and Bonjour.

UPnP is a technical specification for connecting devices such as a PC, peripheral device, AV system, telephone, and household appliance in the home via a network, and providing their functions to each other. UPnP was proposed by Microsoft in 1999 and is supported by 20 or more companies including Intel. UPnP is founded on a standard technology for the Internet, and aims at operating a device by only connecting it to a network without any complicated operation or setting work.

Bonjour is a technique of automatically detecting and connecting a device on an IP network such as Ethernet or wireless LAN (Local Area Network). Bonjour has been developed as a zero configuration technology which is based on a standard protocol defined by the IETF (Internet Engineering Task Force) Zeroconf working group and has the same usability as that of Apple Talk. The Zeroconf working group requests three functions: IP addressing, naming, and service discovery. These functions are implemented as follows. In addressing, communication not involving a router is determined to be of a local network, and an IP address is automatically acquired. Naming uses a multicast DNS in which no local host name need always be set. In service discovery, a device having a function the user wants to use is searched for. Bonjour is mainly adopted in Mac OS available from Apple.

Another discovery protocol is Jini available from Sun Microsystems. In the digital camera disclosed in Japanese Patent Laid-Open No. 2006-67231, pairing information needs to be set in advance while being aware of the type of discovery protocol for each PC. Therefore, it is not easy for a user having little knowledge about the network to correctly set pairing information.

A digital camera and PC have a so-called device & control point relationship in which the digital camera provides an image file to the PC in accordance with an instruction from the PC to acquire the image file. Generally, the PC serving as the control point controls a series of operations including the start of a connection with the digital camera, image transfer, and the end of the connection. However, the user may want to transfer an image file to the PC immediately after shooting, or change the transmission destination PC depending on the type of image file. In such a case, usability would be improved if the user were able to list PCs on the network by operating the digital camera and instruct a connection with the PC he wants while holding the digital camera with his hand.

SUMMARY OF INVENTION

The present invention provides a communication apparatus capable of facilitating a connection with a device in a network by using a discovery protocol for discovering a device in a network as well as a control method thereof.

According to an aspect of the present invention, there is provided a communication apparatus which establishes a connection with a device in a network by using a discovery protocol for discovering the device, comprising: first transmission means for transmitting a search command to search devices in the network; first reception means for receiving pieces of device information transmitted from devices in the network in response to the search command; first selection means for selecting a device based on the pieces of device information received by the first reception means; second transmission means for transmitting a notification signal to notify devices in the network of presence of the communication apparatus after the selection by the first selection means; second reception means for receiving a connection request transmitted from a device in the network, the connection request being transmitted by a device which has received the notification signal; determination means for determining whether the connection request has been transmitted from the device selected by the first selection means; and third transmission means for transmitting a response representing that a connection is accepted in response to the connection request if the determination means determines that the connection request has been transmitted from the device selected by the first selection means.

According to another aspect of the present invention, there is provided a method of controlling a communication apparatus which establishes a connection with a device in a network by using a discovery protocol for discovering the device, the method comprising: a first transmission step of transmitting a search command to search devices in the network; a first reception step of receiving pieces of device information transmitted from devices in the network in response to the search command; a first selection step of selecting a device based on the pieces of device information received in the first reception step; a second transmission step of transmitting a notification signal to notify devices in the network of presence of the communication apparatus after the selection in the first selection step; a second reception step of receiving a connection request transmitted from a device in the network, the connection request being transmitted by a device which has received the notification signal; a determination step of determining whether the connection request has been transmitted from the device selected in the first selection step; and a third transmission step of transmitting a response representing that a connection is accepted in response to the connection request if it is determined in the determination step that the connection request has been transmitted from the device selected in the first selection step.

Further features of the present invention will become apparent from the following description of exemplary embodiments with reference to the attached drawings.

BRIEF DESCRIPTION OF DRAWINGS

FIG. 2 is a block diagram showing the arrangement of a PC;

FIGS. 5A to 5E are views each showing a GUI displayed in image transfer processing by the digital camera;

FIG. 6 is a flowchart showing image transfer processing by the PC;

FIG. 8 is a flowchart showing device search processing by the digital camera;

FIGS. 10A to 10C are views showing SSDP messages to be transmitted/received between the digital camera and the PC;

FIGS. 11A and 11B are views showing descriptions to be transmitted/received between the digital camera and the PC;

FIGS. 12A and 12B are views showing TXT records to be transmitted/received between the digital camera and the PC;

DESCRIPTION OF EMBODIMENTS

<First Embodiment>

Exemplary embodiments of the present invention will now be described in detail in accordance with the accompanying drawings. However, the present invention is not limited to the following embodiments. Also, various embodiments may be appropriately combined.

[Arrangement of Digital Camera]

A digital camera capable of capturing still images and moving images will be explained as an example of a communication apparatus according to the present invention. Note that a device including a digital camera such as a so-called camera-equipped mobile phone or camera-equipped tablet device is also an example of the communication apparatus.

Figure 1:
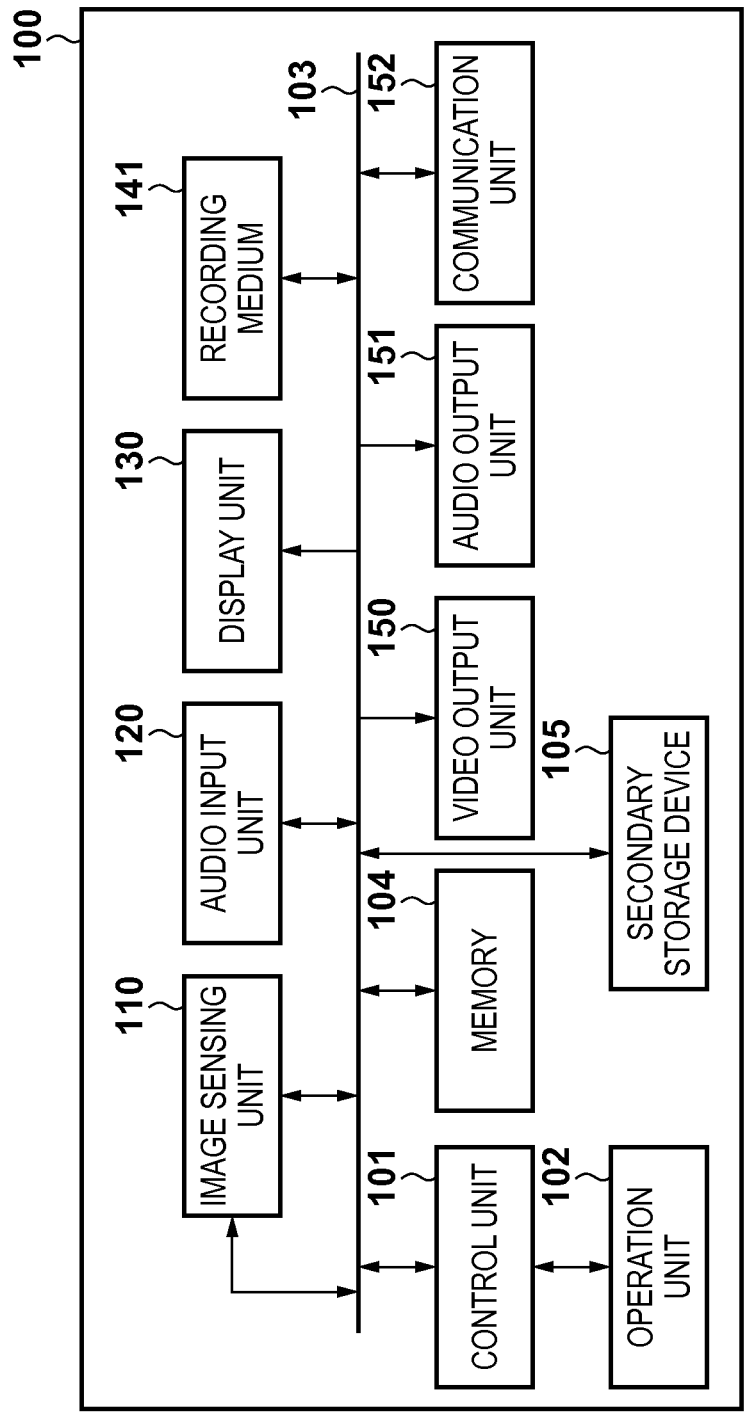
FIG. 1 is a block diagram showing the arrangement of a digital camera.

FIG. 1 is a block diagram showing the arrangement of a digital camera 100 according to the embodiment.

A control unit 101 is formed from, for example, a CPU (MPU) and memory (DRAM and SRAM). The control unit 101 controls the respective blocks of the digital camera 100 by executing various processes (programs), and controls data transmission between the respective blocks. The control unit 101 controls the respective blocks of the digital camera 100 in accordance with an operation signal from an operation unit 102 which accepts an operation from the user.

The operation unit 102 is formed from switches for inputting various operations regarding shooting, such as a power button, zoom adjustment button, and autofocus button. The operation unit 102 can also be formed from a menu display button, SET button, cursor key, pointing device, and touch panel. When the user operates these keys and buttons, the operation unit 102 transmits an operation signal to the control unit 101. The operation unit 102 further includes a release button. The release button is formed from SW1 which is pressed in a so-called half stroke state, and SW2 which is pressed in a so-called full stroke state. A shooting preparation instruction is output by pressing SW1, and a shooting instruction is output by pressing SW2. Note that a release button for still imaging shooting and a release button for moving image shooting are formed from a single button in the embodiment, but can be formed from separate buttons.

A bus 103 is a general-purpose bus for sending various data, control signals, instruction signals, and the like to the respective blocks of the digital camera 100.

An image sensing unit 110 controls the quantity of light by a stop, and converts the optical image of an object captured via a lens into an image signal by an image sensor such as a CCD sensor or CMOS sensor.

An audio input unit 120 collects a sound around the digital camera 100 by an internal omnidirectional microphone, an external microphone connected via an audio input terminal, or the like.

A memory 104 includes, for example, a RAM (Random Access Memory) and flash memory, and includes both a nonvolatile memory and a volatile memory for temporarily recording image signals, audio signals, setting information of the digital camera 100, and the like.

A recording medium 141 is a recording medium connectable to the digital camera 100. The recording medium 141 can record various data and the like generated by the digital camera 100. Examples of the recording medium 141 are a hard disk, optical disk, and flash memory. The embodiment will exemplify a flash memory device which is called a memory card and can be mounted in the digital camera 100.

An audio output unit 151 is formed from, for example, an audio output terminal, and transmits an audio signal to output a sound from a connected earphone, loudspeaker, or the like. The audio output unit 151 may be incorporated in the digital camera 100.

A video output unit 150 is formed from, for example, a video output terminal, and transmits an image signal to display a video on a connected external display or the like. The audio output unit 151 and video output unit 150 may be formed from one integrated terminal such as an HDMI® terminal.

The digital camera 100 according to the embodiment can communicate with another device via a communication unit 152 and network. The communication unit 152 transmits/receives data to/from an external device by serial or parallel communication via a wire or wirelessly using a communication interface such as RS232C, USB, IEEE1394, P1284, SCSI, modem, LAN, or IEEE802.11 interface. By executing a communication protocol conforming to the communication interface, the communication unit 152 can transmit/receive data to/from an external device. Examples of the communication protocol are HTTP (Hyper Text Transfer Protocol) and PTP-IP (Picture Transfer Protocol over IP).

A display unit 130 displays image data recorded on the recording medium 141 and GUIs such as various menus. The display unit 130 can be, for example, a liquid crystal display or organic EL display.

[Arrangement of Personal Computer (PC)]

A personal computer (PC) capable of loading still images and moving images will be explained as an example of an information processing apparatus. Note that a printer, so-called tablet PC, smartphone, and TV receiver with Internet connection capability are also examples of an information processing apparatus.

FIG. 2 is a block diagram showing the arrangement of the PC 200 according to the embodiment.

A PC 200 includes a display unit 201, operation unit 202, CPU 203, primary storage device 204, secondary storage device 205, and communication device 206. The basic functions of the respective units are the same as those in the digital camera 100, and a detailed description thereof will not be repeated. Note that a display device such as an LCD is used as the display unit 201. The PC 200 need not include the display unit 201, and suffices to have a display control function of controlling display on the display unit 201. The secondary storage device 205 may be a device which reads out and writes data from and in a hard disk drive or external storage medium. Examples of the external storage medium are an optical disk (for example, DVD-RW, CD-ROM, CD-R, or DVD-RAM), a magnetic disk (for example, flexible disk or MO), and a nonvolatile memory (for example, flash memory). As the operation unit 202, a keyboard, mouse, or touch panel is usable.

A communication interface and protocol used in the communication device 206 are the same as those in the digital camera 100, and a description thereof will not be repeated. The PC 200 can transmit/receive data to/from an external device using the communication device 206.

[Connection Configuration of Digital Camera and PC]

A connection configuration in the infrastructure will be explained as an example of the network participation form of the digital camera and PC. When one-to-one connection of the digital camera and PC suffices, they can be connected by ad-hoc or Wi-Fi Direct as an example. Wi-Fi Direct is a specification formulated by the Wi-Fi Alliance which is an association devoted to promoting wireless LANs. According to this specification, devices such as a wireless LAN-equipped mobile phone, tablet, PC, digital camera, printer, and portable game player can be connected wirelessly even without an access point.

Figure 3:
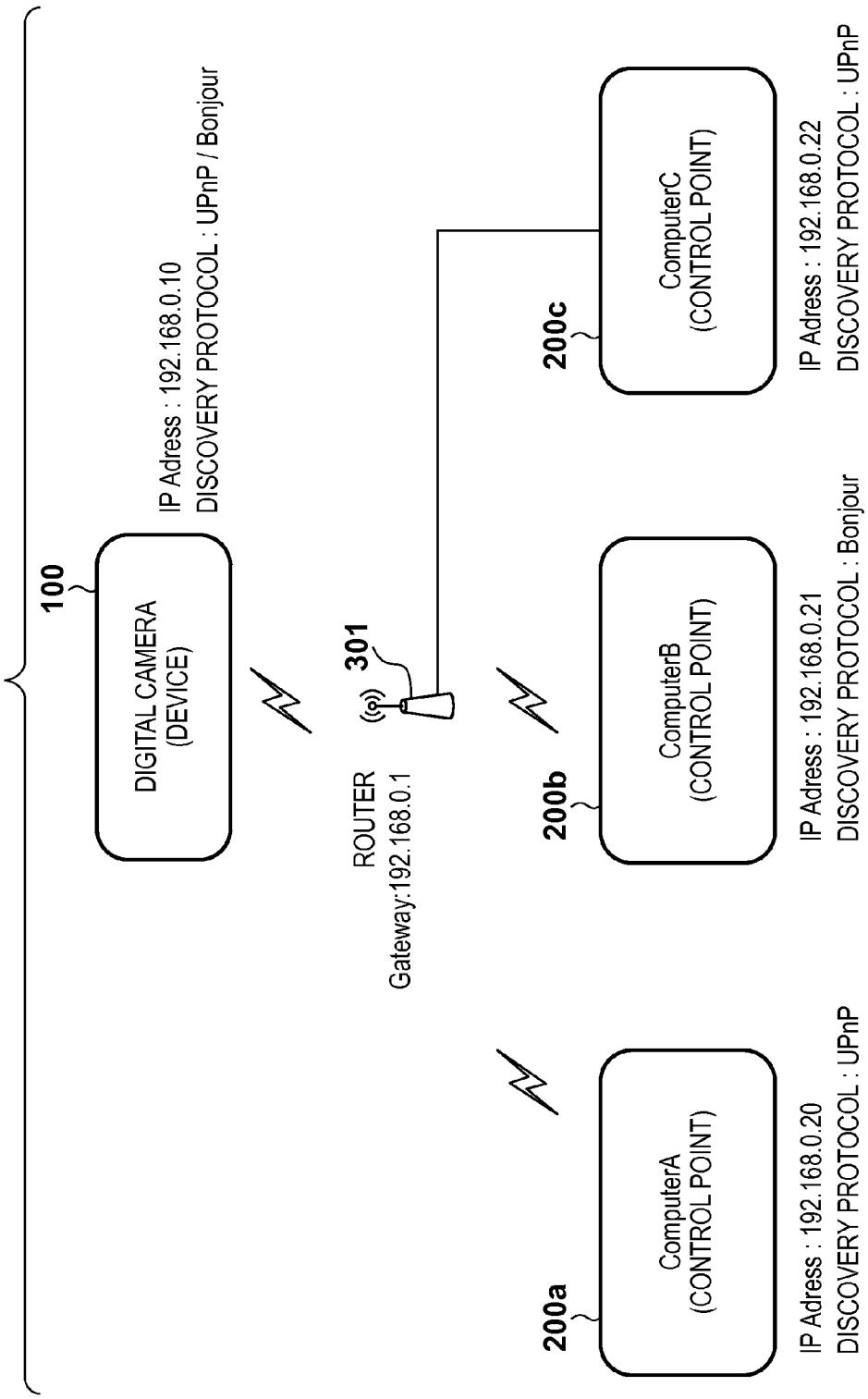
FIG. 3 is a conceptual view showing the connection configuration of the digital camera and PC.

FIG. 3 is a conceptual view showing the configuration of a network in which the digital camera 100 and a plurality of PCs 200 participate.

Reference numeral 301 denotes a router. The router provides a routing function of building a network and relaying communication between network-connected devices such as a portable device and PC. The router complies with the Internet protocol suit, and builds a LAN using an IP address assigned to it as a gateway. The router 301 includes an interface for wired or wireless connection. As an example of the wired connection, a router and device are physically connected by a LAN cable. An example of the wireless connection is a connection complying with IEEE802.11x (x is a, b, g, n, or the like). An SSID (Service Set IDentifier) and encryption key are set in the router. When a device to be connected sets the SSID and encryption key and is approved, it establishes a connection with the router.

When a device such as a portable device or PC is connected to the LAN via a wire or wirelessly, an IP address is assigned to the connected device automatically or manually. A typical protocol in automatic assignment is DHCP (Dynamic Host Configuration Protocol). Data protocols and IP addresses flowing through a network in communication between devices are analyzed to determine a path through which data is to be transferred.

In the embodiment, the router 301 builds a LAN in which the gateway is indicated by 192.168.0.1. An IP address of 192.168.0.10 is assigned to the digital camera 100 wirelessly connected to the LAN. An IP address of 192.168.0.20 is assigned to a wirelessly connected PC 200a "ComputerA". An IP address of 192.168.0.21 is assigned to a wirelessly connected PC 200b "ComputerB". An IP address of 192.168.0.22 is assigned to a wire-connected PC 200c "ComputerC". On the premise of the network having this infrastructure, the embodiment will explain a method of connecting the digital camera 100 to the PC 200 the user wants to connect.

In the digital camera 100 according to the embodiment, a secondary storage device 105 records a program capable of communicating with the PC 200 in conformity with the UPnP and Bonjour specifications serving as discovery protocols for device search on a network. The program records commands for executing communication using UPnP and Bonjour, and device information specific to the digital camera 100 that is necessary for communication by UPnP and Bonjour.

In each of the PCs 200a and 200c according to the embodiment, a program capable of communicating with the digital camera 100 in conformity with the UPnP specification serving as one discovery protocol is installed in the secondary storage device 205. The program records commands for executing communication using UPnP, and PC-specific device information necessary for UPnP communication.

In the PC 200b according to the embodiment, a program capable of communicating with the digital camera 100 in conformity with the Bonjour specification serving as one discovery protocol is installed in the secondary storage device 205. The program records commands for executing communication using Bonjour, and PC-specific device information necessary for Bonjour communication.

In the digital camera 100 according to the embodiment, a program capable of transmitting/receiving an image file to/from the PC 200 in conformity with the PTP-IP specification serving as a protocol for transferring an image is recorded in the secondary storage device 105. The program records a command for executing communication using PTP-IP, an object format code which defines a file transferable by PTP-IP communication, and a device property serving as information for identifying the settings or state conditions of the digital camera.

In each of the PCs 200a, 200b, and 200c according to the embodiment, a program capable of communicating with the PC 200 in conformity with the PTP-IP specification serving as a protocol for transferring an image file is installed in the secondary storage device 205.

Image files are saved in advance in the recording medium 141 in the digital camera 100 and the secondary storage device 205 in the PC 200 according to the embodiment. Image transmission processing in the embodiment is implemented by connecting the digital camera 100 and PC 200 via a network, and saving an image file supplied from the digital camera 100 in an arbitrary directory in the secondary storage device 205 of the PC 200.

The embodiment will exemplify in detail a form in which the digital camera 100 is connected to the PC 200 using the UPnP and Bonjour discovery protocols, and transmits an image file to the PC 200 using PTP-IP. Note that the present invention is not limited by the network configuration, network connection method, discovery protocol type, or transfer protocol described in the embodiment.

[Image Transfer Processing in Digital Camera]

First, the operation of the digital camera 100 in the following series of processes will be explained.

(1) The digital camera 100 and PC 200 are connected via a network built by the router 301.

(2) An image file supplied from the digital camera 100 is saved in an arbitrary directory in the secondary storage device 205 of the PC 200.

(3) The digital camera 100 leaves the network.

Figure 4:
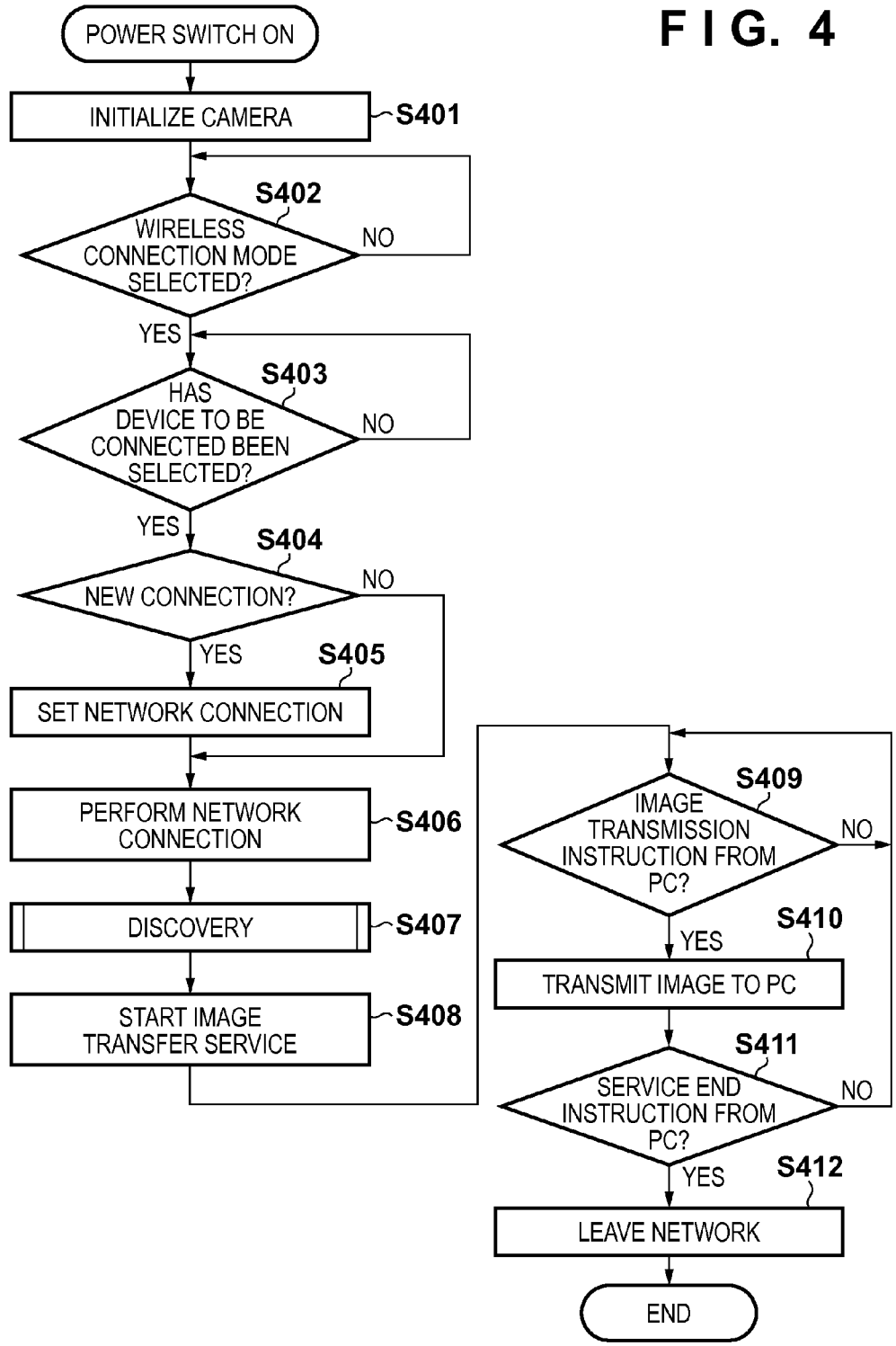
FIG. 4 is a flowchart showing image transfer processing by the digital camera.

FIG. 4 is a flowchart showing the basic operation of the digital camera 100. This sequence starts when the control unit 101 detects that the user has pressed a power button or playback button included in the operation unit 102. Note that processing represented by the flowchart is implemented by controlling the respective units of the digital camera 100 by the control unit 101 in accordance with input signals from the respective units and a program. This also applies to processing represented by another flowchart, unless otherwise specified.

First, in step S401, the control unit 101 executes initialization processing for the digital camera 100. In the initialization processing, the control unit 101 checks whether the recording medium 141 has been mounted, drives a lens barrel for shooting preparation, and switches a mode to be activated by determining which of the power button and playback button has been pressed. The mode includes a shooting mode in which an image file is obtained by shooting, a playback mode in which an image file is displayed and browsed on the display unit 130, a menu mode in which shooting parameters are changed, and a wireless connection mode in which wireless connection is executed. In the embodiment, when the user presses the play button included in the operation unit 102 to activate the camera, the camera starts in the playback mode and displays the GUI (FIG. 5A) of the playback mode in the embodiment on the display unit 130.

In step S402, the control unit 101 detects whether the wireless connection mode has been selected. A button icon 501 for shifting to the wireless connection mode is arranged on the GUI of FIG. 5A. If the user operates the operation unit 102 and presses the button icon 501, the control unit 101 detects that the wireless connection mode has been selected, activates the wireless connection mode, displays the GUI of FIG. 5B on the display unit 130, and advances to step S403. If NO in step S402, the control unit 101 waits until the button icon 501 is pressed.

In step S403, the control unit 101 detects whether a device to be connected has been selected. On the GUI of FIG. 5B, a list of devices connectable to the digital camera 100 is displayed as button icons. When the user presses a button icon, the control unit 101 advances to processing of connecting the digital camera 100 to each device. A button icon 502 is a button icon for advancing to connection processing with the PC 200 serving as a connectable device. The embodiment aims at connecting the digital camera 100 to the PC 200. Hence, if the user operates the operation unit 102 and presses the button icon 502, the control unit 101 detects that a device to be connected has been selected, displays the GUI of FIG. 5C on the display unit 130, and advances to step S404. If NO in step S403, the control unit 101 waits until the user presses the button icon of a device to be connected.

In step S404, the control unit 101 detects whether the current connection is a new connection. The GUI of FIG. 5C displays a button icon 503 for connecting a PC 200 which has not been connected before, and a button icon 504 for connecting again a PC 200 which has been connected before. If the user operates the operation unit 102 and presses the button icon 503, the control unit 101 detects that the digital camera 100 is to be connected to a PC 200 which has not been connected before, displays the GUI of FIG. 5D on the display unit 130, and advances to step S405. If the user presses the button icon 504, the control unit 101 detects that the digital camera 100 is to be connected to a PC 200 which has been connected before, and advances to step S406.

In step S405, the control unit 101 accepts input of a setting item for network connection. On the GUI of FIG. 5D, text boxes for entering an SSID (Service Set IDentifier) and encryption key, which are setting items necessary for wireless connection to the router 301, are arranged. Note that the SSID is the identifier of an access point in an IEEE802.11 wireless LAN, and is a name assigned to avoid interference. The encryption key is a key for performing wireless LAN encryption to prevent unauthorized access. The user displays a software keyboard (not shown) on the display unit 130, and operates the operation unit 102 to enter characters. The control unit 101 temporarily records all the selected characters in the memory 104.

In step S406, the control unit 101 performs network connection. A button icon 505 on the GUI of FIG. 5D is a button icon for supporting the start of wireless connection. When connecting the digital camera 100 to a PC 200 which has not been connected before, the user operates the operation unit 102 and presses the button icon 505. Then, the control unit 101 starts a connection with the router 301 based on the SSID and encryption key temporarily recorded in the memory 104 in step S405. An SSID and encryption key used to connect the digital camera 100 again to a PC 200 which has been connected before are saved as pairing information in the nonvolatile memory of the memory 104 together with another piece of information when the connection with the PC 200 succeeded. Details of the pairing information will be described later. When connecting the digital camera 100 to a PC 200 which has been connected before, the control unit 101 loads, into the RAM of the memory 104, the SSID and encryption key of the pairing information recorded in the nonvolatile memory of the memory 104, and starts a connection with the router 301. If the connection with the router 301 is established, the router 301 assigns an IP address to the digital camera 100. The control unit 101 records the assigned IP address in the RAM of the memory 104.

In step S407, the control unit 101 performs discovery (device search) for a connection with the PC 200. Details of the discovery will be described later.

In step S408, the control unit 101 starts the image transfer service. Image transfer service in the embodiment means image file transfer processing using PTP-IP. If a PC 200 to be connected has been selected in step S407, the PC 200 transmits, to the digital camera 100, a command packet for establishing a session. When the digital camera 100 receives the command packet via the communication unit 152, the control unit 101 analyzes the packet and executes processing for establishing a session. For PTP-IP in the embodiment, this command is an OpenSession command. After establishing a session, the digital camera 100 transmits a response command to the PC 200, displays the GUI of FIG. 5E on the display unit 130, and starts the image transfer service. The GUI of FIG. 5E is a GUI exemplifying a case in which the connection with the PC 200*a* in FIG. 3 has been completed. As another example, no GUI may be displayed on the display unit 130.

In step S409, the control unit 101 detects whether it has received an image transmission request from the PC 200. The digital camera 100 receives, from the PC 200 via the router 301, a command packet representing an image file transfer instruction. The control unit 101 analyzes the command packet, and if it detects that this command represents an image file transmission instruction, advances to step S410. If NO in step S409, the control unit 101 waits until it receives the command packet instructing transmission of an image file.

In step S410, the control unit 101 transmits an image file to the PC 200. In the transmission processing, the control unit 101 reads, from the recording medium 141, an image file designated by the command packet, and loads it into the RAM of the memory 104. Then, the control unit 101 divides the image file into packets, and transmits them to the PC 200. After transmitting all packets corresponding to the size of the image file, the control unit 101 transmits a response command to the PC 200, completing the image transmission.

In step S411, the control unit 101 detects whether it has received an image transfer service end notification from the PC 200. The PC 200 transmits, via the router 301, a command packet for ending the session with the digital camera 100 from the PC 200. For PTP-IP in the embodiment, this command is a CloseSession command. The control unit 101 analyzes the command packet received via the communication unit 152, executes the end of the session, and advances to step S412. If NO in step S411, the control unit 101 waits until it receives the command packet for ending the session.

In step S412, the control unit 101 leaves the network. In this case, the control unit 101 unloads the program which has been loaded into the RAM of the memory 104 and runs according to the image transfer protocol. Then, the control unit 101 multicasts a network leave command based on the discovery protocol to the network. For UPnP in the embodiment, SSDP:Byebye is multicast. For Bonjour, MulticastDNS:goodbye is multicast.

The basic operation regarding image transfer in the digital camera 100 according to the embodiment has been described. The digital camera 100 functions as a device which operates in accordance with an instruction transmitted in response to an instruction of the image transfer protocol from the PC 200.

[Image Transfer Processing in PC]

Next, the operation of the PC 200 in the above-described processes (1) to (3) will be explained.

FIG. 6 is a flowchart showing the basic operation of the PC 200. This sequence starts upon completion of activation processing of the PC 200. In the activation processing, the PC 200 is activated by pressing a power button (not shown) serving as one button of the operation unit. The PC 200 performs checking of each hardware module and the like. The CPU 203 loads, into the primary storage device 204, an operating system (to be referred to as an OS hereinafter) which is saved in the secondary storage device 205.

First, in step S601, the CPU 203 performs network connection. In the network connection, the CPU 203 connects the PC 200 via the wireless or wired communication device 206 to the router 301 which builds a desired network.

The CPU 203 records an IP address assigned by the router 301 in the primary storage device 204. Note that the wireless and wired connection methods are the same as those in FIG. 3 and step S406 of FIG. 4, and a description thereof will not be repeated.

In step S602, the CPU 203 performs discovery (device search). Details of the discovery will be described later.

In step S603, the CPU 203 instructs the start of the image transfer service. The image transfer service in the embodiment means image file transfer processing using PTP-IP. In this case, the CPU 203 transmits a command packet for establishing a session with the digital camera 100. For PTP-IP in the embodiment, this command is an OpenSession command. If the CPU 203 receives a response packet transmitted after the digital camera 100 processes the command packet, and determines that the image transfer service has started, it advances to step S604.

In step S604, the CPU 203 instructs the digital camera 100 to transmit an image file. The CPU 203 generates a command packet instructing transfer of an image file by PTP-IP, and transmits it to the digital camera 100. For PTP-IP in the embodiment, this command is a GetObject command. Before GetObject, it is necessary to execute a GetDeviceInfo command and GetObjectInfo command, and acquire device information of the digital camera 100 and the number and type of image files saved in the recording medium 141.

In step S605, the CPU 203 receives an image file. The CPU 203 saves the data packet of the image file transmitted from the digital camera 100 in an arbitrary directory of the secondary storage device 205. Upon receiving all packets corresponding to the size of the image file, the CPU 203 finalizes the image file and completes the saving. When a plurality of image files are received, the CPU 203 repeats the above-described processing.

In step S606, the CPU 203 determines whether it has detected an image transfer service end instruction. If the user ends the transfer of the image file he wants, and presses an end button arranged on the GUI of an image transfer program (not shown) displayed on the display unit 201 in order to end the image transfer service, the CPU 203 detects the image transfer service end instruction and advances to step S607. If NO in step S606, the CPU 203 returns to step S604, and instructs again the digital camera 100 to transmit an image file.

In step S607, the CPU 203 instructs the end of the image transfer service. In this case, the CPU 203 transmits, to the digital camera 100, a command packet for ending the session with the digital camera 100. For PTP-IP in the embodiment, this command is a CloseSession command.

If the CPU 203 receives a response command transmitted after the digital camera 100 processes the command packet, it ends the image transfer service program in the PC 200.

The basic operation regarding image transfer in the PC 200 according to the embodiment has been described. The PC 200 functions as a control point which instructs the digital camera 100 to transmit an image according to the image transfer protocol.

[Discovery Processing (Connection for First Time) in Digital Camera]

Figure 7A:
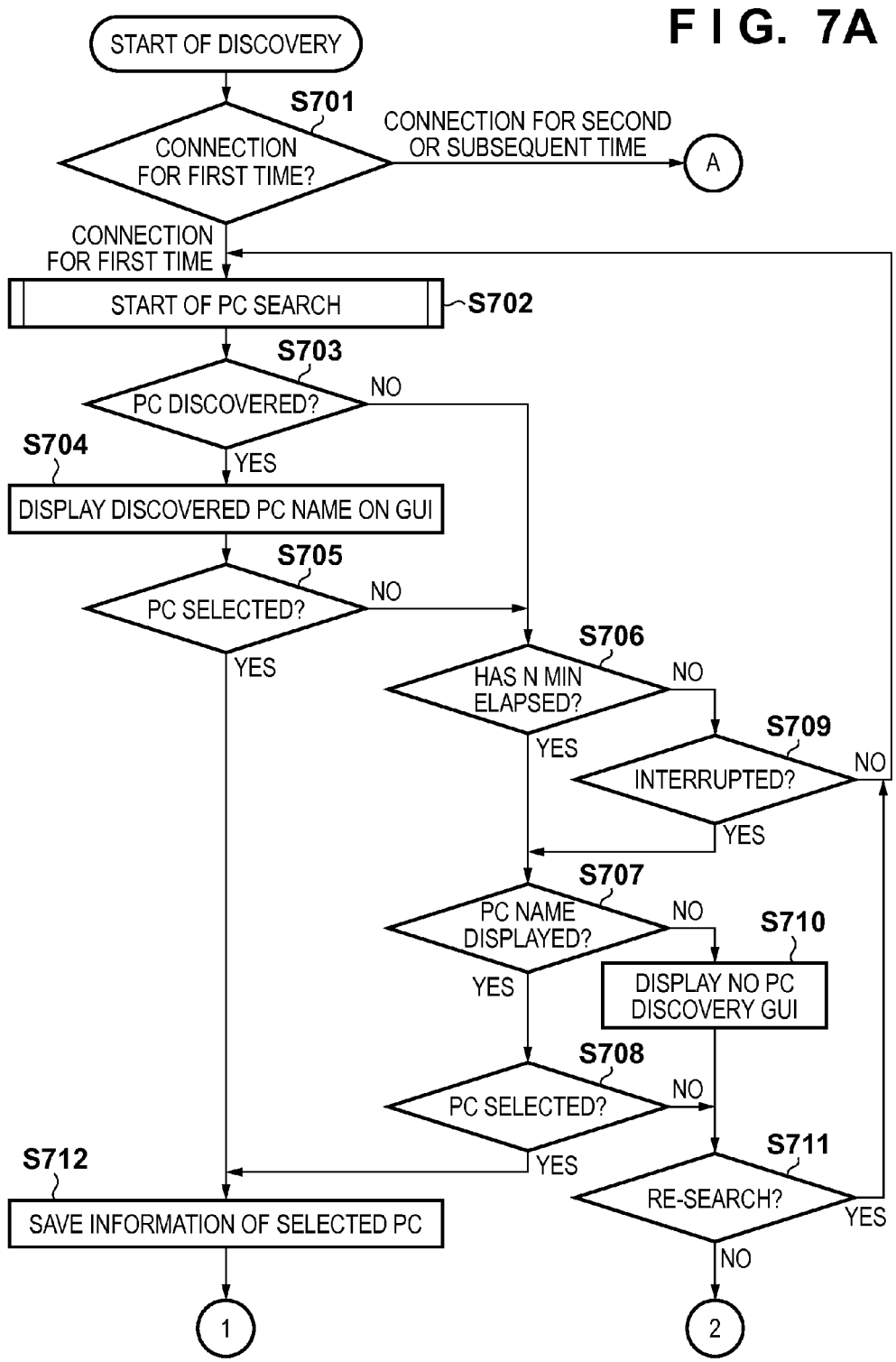
FIGS. 7A and 7B are flowcharts showing discovery processing by the digital camera.
Figure 7B:
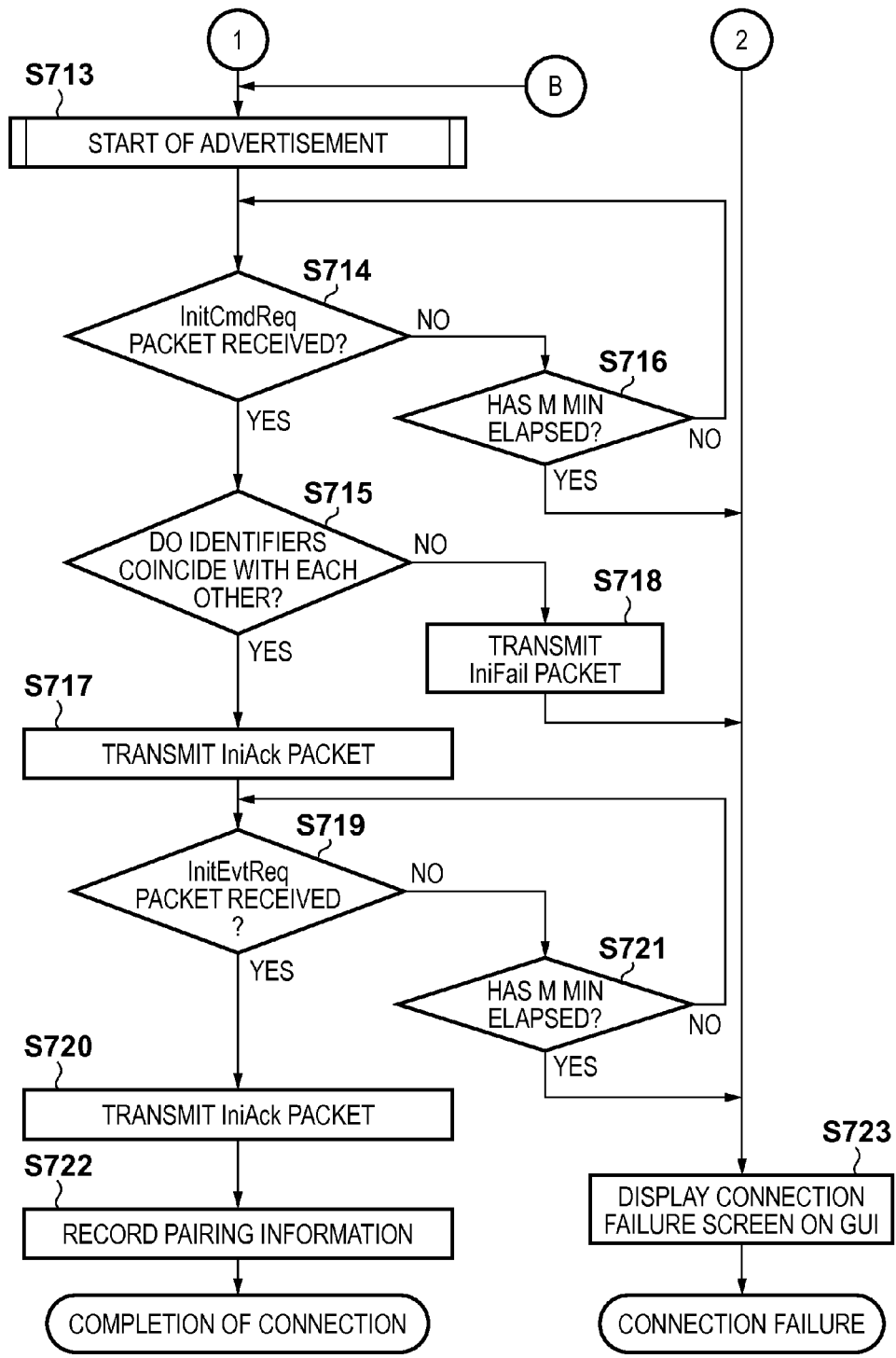

Details of the discovery in step S407 of FIG. 4 will be explained. FIGS. 7A and 7B are flowcharts showing a discovery operation in the digital camera 100.

First, in step S701, the control unit 101 detects whether the digital camera 100 is to be connected to a PC 200 which has not been connected before. If the user selects the button icon 503 on the GUI of FIG. 5C displayed in step S404 of FIG. 4, the control unit 101 determines that the digital camera 100 is to be connected to a PC 200 which has not been connected before, and advances to step S702. If NO in step S701, the control unit 101 advances to processing A in order to connect the digital camera 100 to a PC 200 which has been connected before.

Figure 13A:
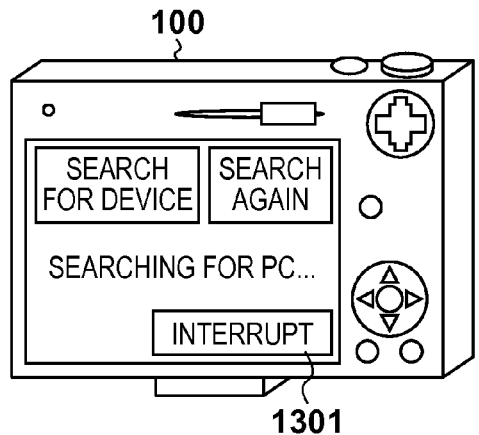
FIGS. 13A to 13F are views each showing a GUI displayed in discovery processing by the digital camera.

In step S702, the control unit 101 starts searching for a network-connected PC 200. Details of the search processing for the PC 200 will be explained with reference to a flowchart shown in FIG. 8. As described with reference to FIG. 3, the digital camera 100 in the embodiment copes with communication by both the UPnP and Bonjour discovery protocols. For this reason, UPnP-compliant PCs and Bonjour-compliant PCs detected by these two discovery protocols serve as connection targets. In FIG. 3 of the embodiment, the PCs 200a and 200c are UPnP-compliant PCs, and the PC 200b is a Bonjour-compliant PC. An example of the UPnP-compliant PC is a PC in which a Windows® OS available from Microsoft is installed. An example of the Bonjour-compliant PC is a PC in which Mac OS® available from Apple is installed. The control unit 101 starts device search and displays the GUI of FIG. 13A on the display unit 130.

In step S801, the control unit 101 detects whether it has received an SSDP:Alive message multicast. SSDP (Simple Service Discovery Protocol) is a protocol for searching for and discovering a device supporting UPnP on a network. SSDP:Alive performs a so-called Advertisement operation of multicasting the presence of a device to devices on a network when the device is connected to the network. Advertisement in FIG. 10A is an example of SSDP data multicast by the PC 200 for Advertisement. A HOST header indicates a multicast IP address. A CHACHE-CONTROL header indicates, in seconds, the time when Advertisement becomes valid. A LOCATION header indicates the URL of the PC 200. An NT tag indicates a device type to be notified to the network. SERVER indicates the OS of the PC 200. In FIG. 3 of the embodiment, after the PCs 200a and 200b are connected to the network, they multicast SSDP:Alive. If the control unit 101 detects that it has received SSDP:Alive from the PC 200 on the network, it advances to step S802; if NO in step S801, to step S804.

In step S802, the control unit 101 executes HTTP GET to acquire device information of the PC 200. A UPnP-compliant PC describes its device information in the XML (eXtensible Markup Language) format and saves it as a description. Description in FIG. 11A is an example of the description saved in the secondary storage device 205 by the PC 200. Description in FIG. 11A is formed from several tags. For example, a UDN tag indicates the GUID (Globally Unique IDentifier) of the PC 200. A friendlyName tag indicates a PC name. A deviceType tag indicates a device type. A serviceType tag indicates a service which can be provided by the PC 200. HTTP GET is a method for acquiring data from a communication destination in accordance with the HTTP protocol. If the control unit 101 detects in step S801 that it has received the SSDP:Alive multicast, it instructs the multicasting PC 200 to transmit the description.

In step S803, the control unit 101 acquires the description. If the PC 200 receives the description transmission instruction from the digital camera 100 in step S802, it transmits the description to the digital camera 100. The control unit 101 saves, in the RAM of the memory 104, the description acquired via the communication unit 152 and advances to step S815.

In step S804, the control unit 101 detects whether it has received a MulticastDNS:Notify message multicast. When a device is connected to a network in MulticastDNS, it adds, to the Notify message, serviceType indicating the presence of the device and services which can be provided by the device, and then multicasts the Notify message to devices on the network. In FIG. 3 of the embodiment, after the PC 200b is connected to the network, it adds, to the Notify message, serviceType "_ptp-init" representing that it can operate as an initiator in PTP-IP, and multicasts the Notify message. If the control unit 101 detects that it has received the Notify message, it advances to step S805; if NO in step S804, to step S807.

In step S805, the control unit 101 requests a TXT record. A Bonjour-compliant PC describes its device information in the text format, and saves it as a TXT record. FIG. 12A exemplifies a TXT record saved in the secondary storage device 205 by the PC 200. The TXT record is linked with serviceType, and formed from Key and its value. In the embodiment, serviceType multicast from the PC 200 is "_ptp-init", and Version Key of the TXT record linked with serviceType indicates the version of the TXT record. Model Key indicates the type of device model. Product Key indicates a product name. Service Available Key indicates whether the service has become valid. If the service has become valid, Value is updated to 1. GUID Key indicates the GUID of the PC 200. If the control unit 101 detects reception of the Notify message in step S802, it refers to serviceType added to the message. If serviceType represents that the image transfer service can be provided, the control unit 101 instructs the multicasting PC to transmit the TXT record. For example, in FIG. 3, assume that serviceType multicast by the PC 200b is "_ptp-init", and serviceType of the PC to be searched for by the digital camera 100 is "_ptp-init". In this case, the control unit 101 instructs the PC 200b to transmit the TXT record.

In step S806, the control unit 101 acquires the TXT record. If the PC 200 receives the TXT record transmission instruction from the digital camera 100 in step S805, it transmits the TXT record to the digital camera 100. The control unit 101 saves, in the RAM of the memory 104, the TXT record acquired via the communication unit 152 and advances to step S815.

In step S807, the control unit 101 starts M-Search of SSDP. M-Search is a method of detecting a UPnP-compliant device on a network. M-Search in FIG. 10B is an example of SSDP data for executing M-Search. A HOST header indicates a multicast IP address. An ST header indicates a device type to be searched for. An MX header indicates, in minutes, the time when search becomes valid.

In step S808, the control unit 101 starts Query of MulticastDNS. Query is a method of detecting a Bonjour-compliant device on a network. serviceType to be searched for is designated, and Query is executed.

In step S809, the control unit 101 detects whether it has received an SSDP response. When M-Search starts in step S807, a UPnP-compliant PC on the network transmits a response to the digital camera 100. FIG. 10C exemplifies SSDP data transmitted as Response. An ST header indicates a device type to be searched for. A LOCATION header indicates the IP address of the PC 200. SERVER indicates the OS of the PC 200. The control unit refers to the ST: tag of M-Search multicast from the PC 200. The ST: tag indicates the type of device to be searched for. If the PC 200 is of the target device type, the PC 200 transmits Response in FIG. 10C to the digital camera 100. If the control unit 101 detects the SSDP response via the communication unit 152, it advances to step S810; if NO in step S809, to step S812.

In step S810, the control unit 101 executes HTTP GET for acquiring the description of the PC 200. This processing is the same as that in step S802, and a description thereof will not be repeated.

In step S811, the control unit 101 acquires the description. This processing is the same as that in step S803, and a description thereof will not be repeated.

In step S812, the control unit 101 determines whether it has received the Query response of MulticastDNS. If Query starts in step S808, the PC 200 corresponding to the set serviceType transmits a response to the digital camera 100. If the control unit 101 detects the Query response, it advances to step S813. If NO in step S812, the control unit 101 determines that no device has been detected, and handles this as no PC discovery.

In step S813, the control unit 101 instructs transmission of the TXT record. This processing is the same as that in step S805, and a description thereof will not be repeated.

In step S814, the control unit 101 acquires the TXT record. This processing is the same as that in step S806, and a description thereof will not be repeated.

In step S815, the control unit 101 detects whether the PC is connectable. For a UPnP-compliant PC, the control unit 101 refers to the SERVER headers in FIGS. 10A and 10C and determines whether the OS is a connection target. If the control unit 101 determines that the OS is a connection target, it saves the friendlyName tag of the description in FIG. 11A as a PC name in the memory 104 together with GUID described in the UDN tag. For a Bonjour-compliant PC, the control unit 101 acquires an address record (not shown), acquires the host name of the PC, and saves the host name as a PC name in the memory 104 together with GUID Key of the TXT record in FIG. 12A. Then, the control unit 101 handles this as PC discovery. If NO in step S815, the control unit 101 handles this as no PC discovery.

Details of the search processing have been described.

In step S703, the control unit 101 detects whether the PC 200 has been discovered. If the control unit 101 detects that the PC 200 has been discovered in the device search processing of FIG. 8, it advances to step S704; if NO in step S703, to step S706.

Figure 13B:
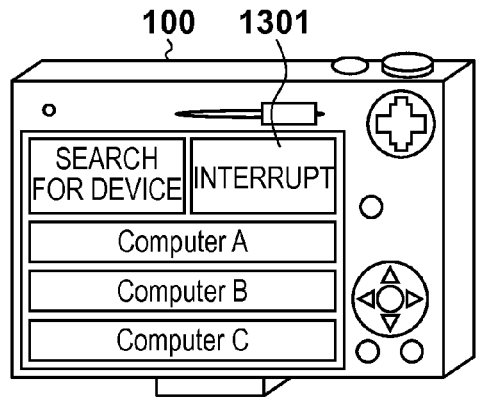
Figure 13C:
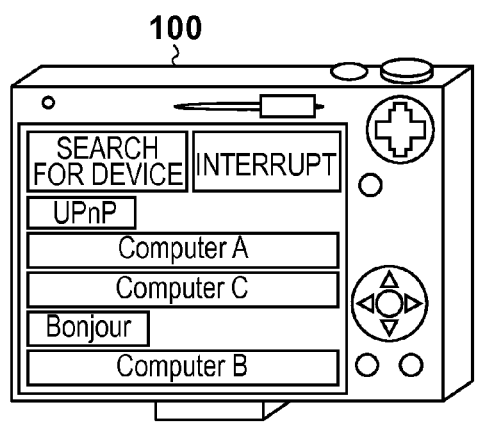

In step S704, the control unit 101 displays the PC name of the discovered PC 200 on the GUI. The PC name saved in the memory 104 in step S815 of FIG. 8 is displayed as a GUI on the display unit 130. Every time a PC is discovered, the control unit 101 adds display of its PC name to the GUI. GUIs in FIGS. 13B and 13C are examples of this. On the GUI of FIG. 13B, PC names are displayed on the GUI regardless of the discovery protocol. As another display method, the PCs 200 may be categorized for respective discovery protocols, as on the GUI of FIG. 13C. As still another method, although not shown, search results may be displayed at once upon the lapse of the device search time in step S706.

In step S705, the control unit 101 detects whether a PC 200 has been selected. PC names displayed on the GUI of FIG. 13B in step S704 can be selected using the operation unit 102. When the user selects one of the displayed PC names, the control unit 101 advances to step S712; if NO in step S705, to step S706.

In step S706, the control unit 101 detects whether the device search time (N min) has elapsed. The device search time is defined in advance by a program, or is set by the user in a menu mode (not shown) and recorded in the nonvolatile memory of the memory 104. If the control unit 101 detects that the defined/set time has elapsed, it advances to step S707; if NO in step S706, to step S709.

In step S707, the control unit 101 detects whether the PC name has already been displayed. When one or more PCs have been discovered, connectable PC names are displayed on the GUI in step S704. If the control unit detects that the GUI has been displayed, it advances to step S708; if NO in step S707, to step S710.

In step S708, the control unit 101 detects whether a PC 200 has been selected. This processing is the same as that in step S705, and a description thereof will not be repeated. If the control unit 101 detects that a PC 200 has been selected, it advances to step S712; if NO in step S708, to step S711.

In step S709, the control unit 101 detects whether the device search has been interrupted. On the GUIs of FIGS. 13A and 13B, an interrupt button icon 1301 is arranged. When the user presses the interrupt button icon 1301, the control unit 101 detects that an interrupt is instructed, interrupts the device search, and advances to step S707. If NO in step S709, the control unit 101 returns to step S702 and continues the device search.

Figure 13D:
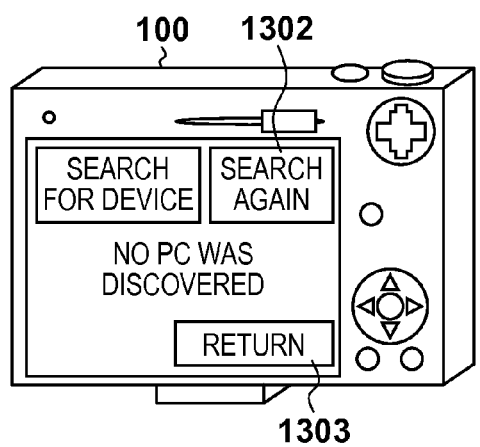

In step S710, the control unit 101 displays, on the display unit 130, a GUI representing that the PC 200 has not been discovered. The GUI in FIG. 13D is an example of this.

In step S711, the control unit 101 detects whether or not the user has selected re-search. On the GUI of FIG. 13D, an icon button 1302 for performing re-search is arranged. If the user operates the operation unit 102 and presses not the re-search icon button but a return button 1303, the control unit 101 ends the discovery processing and advances to step S723. If YES in step S711, the control unit 101 resets the device search time counter, returns to step S702, and executes the device search again.

In step S712, the control unit 101 temporarily saves pairing information of the selected PC 200 in the RAM of the memory 104. For UPnP, the following information is saved from the description (FIG. 11A) acquired from the selected PC 200:

PC name described in the friendlyName header,
discovered discovery protocol type,
IP address described in the LOCATION header of Advertisement (FIG. 10A) or Response (FIG. 10C), and
GUID (Globally Unique IDentifier) described in the UDN tag.

For Bonjour, the host name and IP address of a PC that have been acquired from an address record (not shown), the x discovered discovery protocol type, and the GUID of GUID Key in the TXT record (FIG. 12A) are saved.

Figure 9:
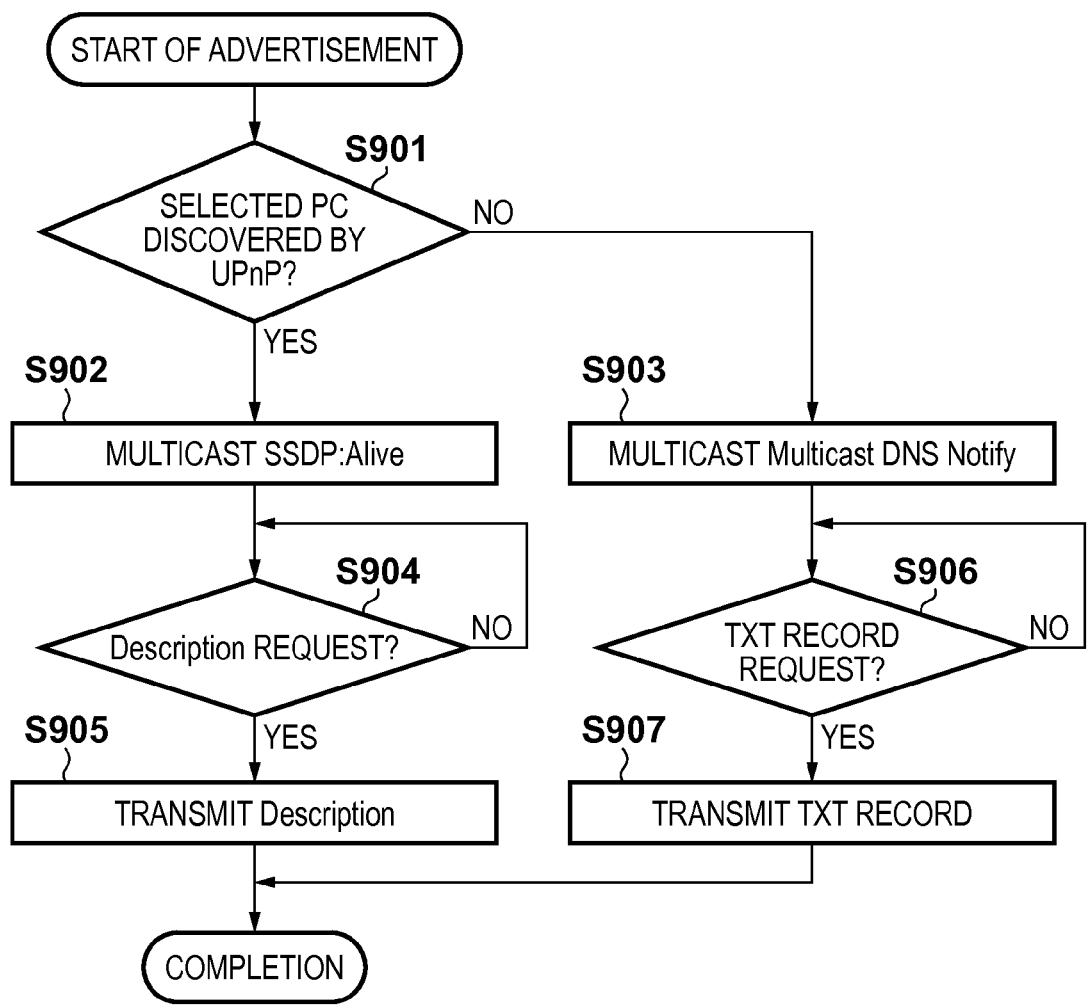
FIG. 9 is a flowchart showing advertisement processing by the digital camera.
Figure 13E:
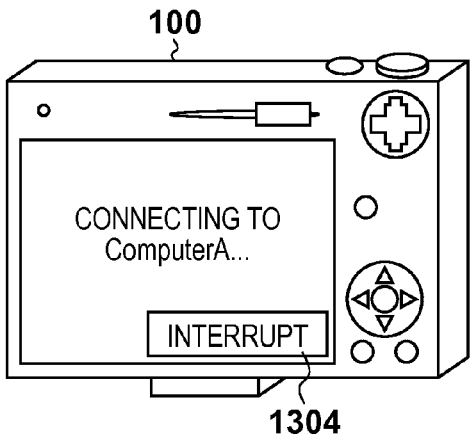

In step S713, the control unit 101 starts advertisement. Details of the advertisement processing will be explained with reference to a flowchart shown in FIG. 9. After the start of advertisement processing, the control unit 101 displays a GUI in FIG. 13E on the display unit 130.

In step S901, the control unit 101 detects whether the discovery protocol with which the PC 200 was selected in step S705 or S708 has been discovered is UPnP. The control unit 101 refers to the pairing information temporarily saved in the RAM of the memory 104 in step S712, and if it detects that the discovery protocol is UPnP, advances to step S902. If NO in step S901, the control unit 101 advances to step S903.

In step S902, the control unit 101 multicasts SSDP:Alive.

In step S903, the control unit 101 multicasts Multicast DNS Notify together with serviceType.

In step S904, the control unit 101 detects whether it has received a description transmission instruction from the PC 200. If the control unit 101 detects that it has received a transmission instruction from the PC 200, it advances to step S905. If NO in step S904, the control unit 101 waits until it receives a request. FIG. 11B exemplifies a description held in the digital camera 100. The description in FIG. 11B is formed from several tags. For example, a URLBase tag indicates the IP address of the digital camera 100. A deviceType tag indicates a device type. A friendlyName tag indicates the name of the digital camera 100. A UDN tag indicates the GUID of the digital camera 100. A serviceType tag indicates a service which can be provided by the digital camera 100. HTTP GET is a method for acquiring data from a communication destination in accordance with the HTTP protocol. If the user presses an interrupt button icon 1304 on the GUI of FIG. 13E, the control unit 101 interrupts the advertisement.

In step S905, the control unit 101 transmits the description to the requesting PC 200.

In step S906, the control unit 101 detects whether it has received a TXT record transmission instruction. If the control unit 101 detects that it has received a transmission instruction from the PC 200, it advances to step S907. If NO in step S906, the control unit 101 waits until it receives a request. FIG. 12B exemplifies a TXT record held in the digital camera 100. The TXT record is linked with serviceType, and formed from Key and its value. In the embodiment, serviceType multicast from the digital camera 100 is "_ptp", and Version Key of the TXT record linked with serviceType indicates the version of the TXT record. Model Key indicates the type of device model. Product Key indicates a product name. Service Available Key indicates whether the service has become valid. If the service has become valid, Value is updated to 1. GUID Key indicates the GUID of the digital camera 100. Target GUID Key indicates the GUID of the PC 200 selected in step S705. If the user presses the interrupt button icon 1304 on the GUI of FIG. 13E, the control unit 101 interrupts the advertisement.

In step S907, the control unit 101 transmits the TXT record to the requesting PC 200.

Details of the advertisement processing by the digital camera 100 in step S713 have been described.

In step S714, the control unit 101 detects whether it has detected reception of an InitCommandRequest packet transmitted from the PC 200. The InitCommandRequest packet is one packet type defined by PTP-IP, and is used to exchange device information between a PC and a digital camera and finalize a TCP port number for transmitting/receiving commands and data. If the control unit 101 detects reception of InitCommandRequest via the communication unit 152, it advances to step S715; if NO in step S714, to step S716.

In step S715, the control unit 101 detects whether identifiers coincide with each other. In this processing, the control unit 101 detects whether the PC 200 selected in step S705 or S708 coincides with the PC 200 which has transmitted the InitCommandRequest packet. The GUID of the PC 200 is saved in the InitCommandRequest packet received in step S714. This GUID is compared with the GUID saved as pairing information in step S712. If these GUIDs coincide with each other, the control unit 101 determines that the PCs 200 are the same PC, and advances to step S717; if NO in step S715, to step S718. Instead of comparing GUIDs, the IP address of a selected PC and that of a PC which has transmitted InitCommandRequest may be compared, and if these IP addresses coincide with each other, it may be determined that these PCs are the same PC. The identifier is arbitrary as long as it can be confirmed that a PC 200 selected in discovery and a PC 200 which has transmitted the InitCommandRequest packet coincide with each other.

In step S716, the control unit 101 detects whether M min serving as the period of validity of advertisement processing has elapsed. The period during which reception of the InitCommandRequest packet is accepted is defined in advance by a program, or is set by a user instruction. The control unit 101 detects whether this period has elapsed. If this period has not elapsed, the control unit 101 repeats step S714; if NO in step S716, to step S723.

In step S717, the control unit 101 transmits an InitAct packet to the PC. If the control unit 101 determines in step S715 that the identifiers coincide with each other, the control unit 101 transmits the InitAct packet to notify the PC that acceptance of the InitCommandRequest packet has been permitted.

In step S718, the control unit 101 transmits an InitFail packet to the PC. If the control unit 101 determines in step S715 that the identifiers do not coincide with each other, the control unit 101 transmits the InitFail packet to notify the PC that acceptance of the InitCommandRequest packet has been rejected.

In step S719, the control unit 101 detects whether it has received an InitEventRequest packet. The InitEventRequest packet is one packet type defined by PTP-IP, and finalizes a TCP port number for transmitting/receiving an event. If the control unit 101 detects reception of InitEventRequest via the communication unit 152, it advances to step S720; if NO in step S719, to step S721.

In step S720, the control unit 101 transmits an InitAct packet to the PC.

In step S721, the control unit 101 detects whether M min serving as the period of validity of advertisement processing has elapsed. The same period as that in step S716 is set, and if M min has elapsed, the control unit 101 advances to step S723; if NO in step S721, repeats step S719.

Figures 14, 15:
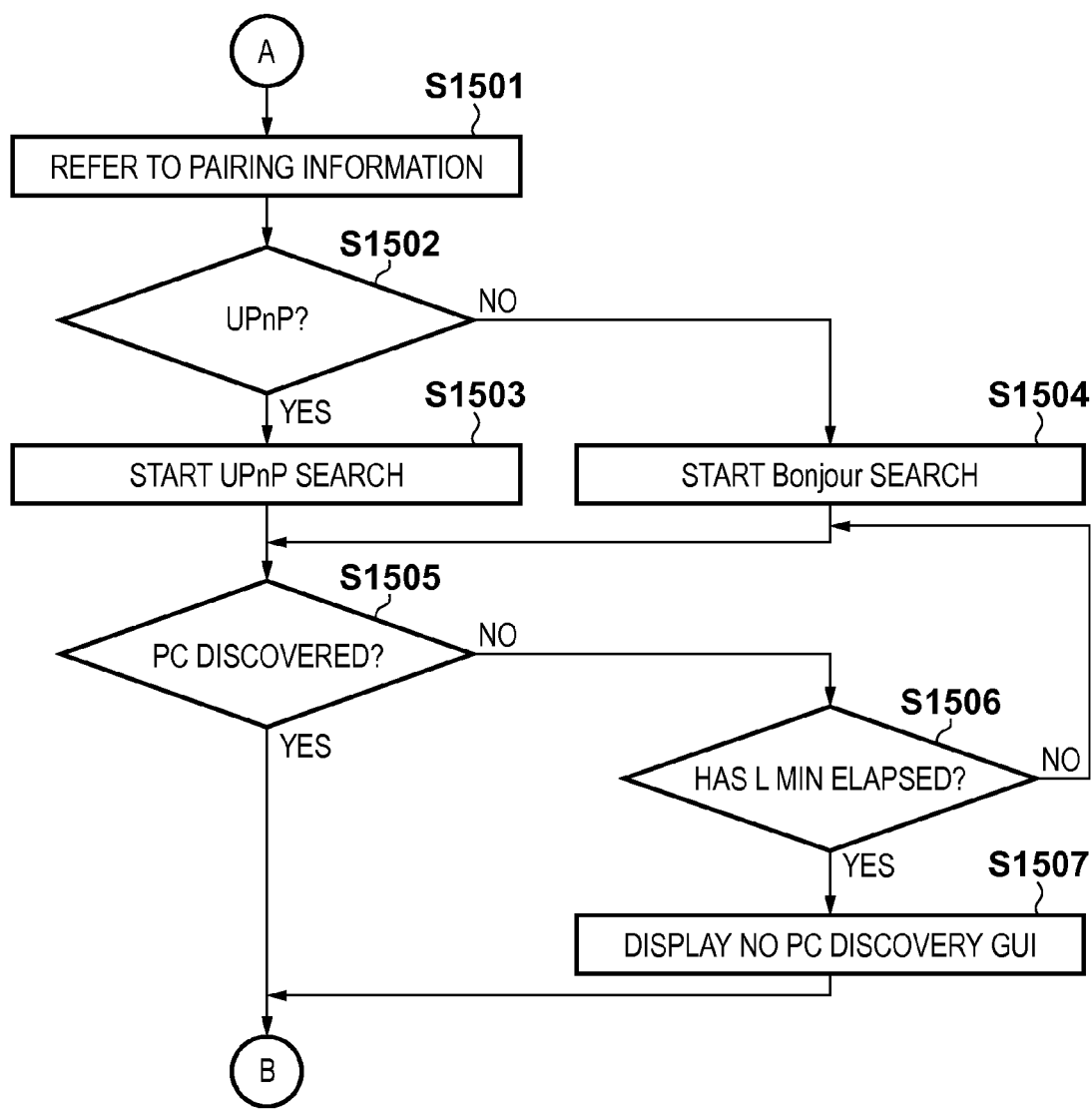
FIG. 14 is a view showing pairing information of the digital camera.
FIG. 15 is a flowchart showing discovery processing by the digital camera.

In step S722, the control unit 101 records pairing information. The information saved in the memory 104 in steps S405 and S712 is saved in the nonvolatile memory. FIG. 14 is a conceptual view showing pairing information to be saved. PC Name indicates the name of a connected PC 200. PC GUID indicates the GUID of the connected PC 200. Discovery Protocol indicates a discovery protocol used in device search. IP Address indicates the IP address of the connected PC 200. SSID indicates the SSID of a network connected in connection to the PC 200. Security Key indicates the encryption key of the network connected in connection to the PC 200.

Figure 13F:
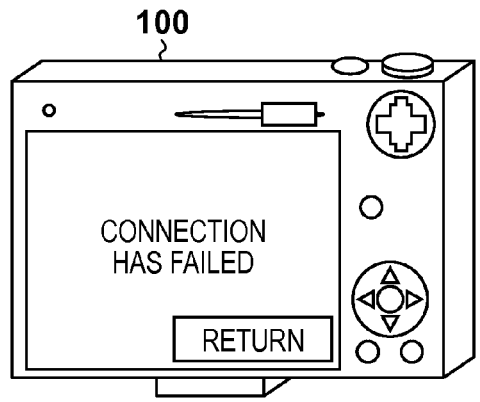

In step S723, the control unit 101 displays a connection failure screen on the display unit 130. A GUI in FIG. 13F is an example of this.

Details of the discovery processing by the digital camera in connection for the first time have been described.

[Discovery Processing (Connection for Second and Subsequent Times) in Digital Camera]

Details of the discovery in step S407 of FIG. 4 will be explained. FIG. 15 is a flowchart showing a discovery operation when connecting the digital camera 100 to a PC which has been connected before. This flowchart shows processing until the process returns to the start of advertisement processing in step S713 after it is determined in step S701 of FIG. 7A in discovery processing that the digital camera 100 is to be connected to a PC 200 for the second or subsequent time.

First, in step S1501, the control unit 101 refers to pairing information. Pairing information which has been recorded in the nonvolatile memory of the memory 104 in a previous connection is referred to.

In step S1502, the control unit 101 detects whether the discovery protocol of the previously connected PC 200 is UPnP. The control unit 101 refers to the discovery protocol in the pairing information in step S1501, and if the discovery protocol is UPnP, advances to step S1503. If NO in step S1502, the control unit 101 advances to step S1504.

In step S1503, the control unit 101 searches for UPnP devices. In this case, the same processes as those in steps S807, S809, S810, S811, and S815 of FIG. 8 are sequentially performed, so a description thereof will not be repeated.

In step S1504, the control unit 101 searches for Bonjour devices. In this case, the same processes as those in steps S808, S812, S813, S814, and S815 of FIG. 8 are sequentially performed, so a description thereof will not be repeated.

In step S1505, the control unit 101 detects whether a PC 200 has been discovered. The control unit 101 compares the GUID acquired from the description or TXT record acquired in step S1503 or S1504 with the GUID in the pairing information. If these GUIDs coincide with each other, the control unit 101 determines that a PC 200 which has been connected before has been discovered. If NO in step S1505, the control unit 101 advances to step S1506.

In step S1506, the control unit 101 detects whether L min has elapsed. That is, if a PC 200, which has been connected before, is not discovered, the control unit 101 repeats step S1505 until the time defined in advance by a program or set by the user has elapsed. If the control unit 101 detects that L min has elapsed, the process advances to step S1507.

In step S1507, the control unit 101 displays, on the display unit 130, a GUI representing that the PC 200 has not been discovered. A GUI in FIG. 13D is an example of this.

If the control unit 101 discovers a PC in step S1505, it advances to step S713 of FIG. 7B, and starts advertisement processing. Subsequent processing is the same as that described above.

Details of the discovery operation for connecting the digital camera 100 to a PC which has been connected before have been described.

[Discovery Processing in PC]

Figure 16:
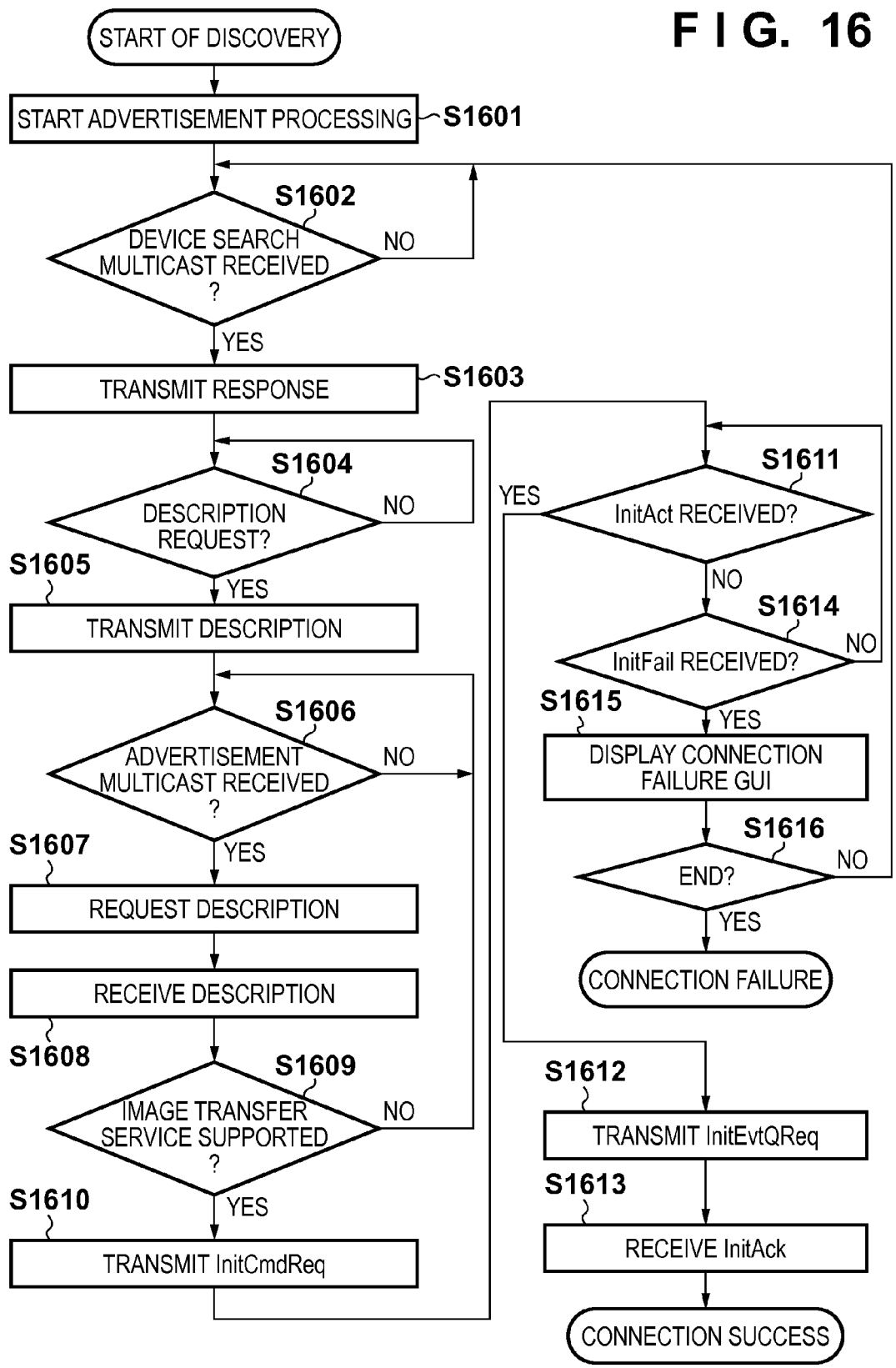
FIG. 16 is a flowchart showing discovery processing by the PC.

Next, details of the discovery in step S602 of FIG. 6 in the PC 200 will be explained. FIG. 16 is a flowchart showing a discovery operation in the PC 200.

First, in step S1601, the CPU 203 starts advertisement processing. The advertisement processing is provided as a basic function by the OS of the PC 200 or as a function of an application installed in the secondary storage device 205. The PC 200 starts the advertisement processing in conformity with a compliant discovery protocol. A UPnP-compliant PC multicasts SSDP:Alive. A Bonjour-compliant PC multicasts Multicast DNS Notify.

In step S1602, the CPU 203 detects whether it has received a device search multicast. The digital camera 100 executes M-Search or Multicast DNS Query to multicast the device search to devices on the network. If the CPU 203 detects that it has received the multicast via the communication device 206, it advances to step S1603. If NO in step S1602, the CPU 203 continues the processing until it receives the multicast.

In step S1603, the CPU 203 transmits a response. For M-Search, the CPU 203 transmits Response in FIG. 10C. For Query, the CPU 203 refers to the added serviceType, and if it determines that the serviceType indicates the image transfer service held in the PC 200, transmits a response to the digital camera 100 and advances to step S1604.

In step S1604, the CPU 203 detects whether it has received a description request from the digital camera 100. When the digital camera 100 receives the response in step S1603, it transmits a description acquisition request to the PC 200. For UPnP, the digital camera 100 executes HTTP GET and instructs acquisition of a description. For Bonjour, the digital camera 100 instructs acquisition of a TXT record. If the CPU 203 detects that it has received the description transmission instruction via the communication device 206, it advances to step S1605. If NO in step S1604, the CPU 203 waits until it detects the description transmission instruction.

In step S1605, the CPU 203 transmits the description to the digital camera 100. For UPnP, the CPU 203 transmits Description as shown in FIG. 11A. For Bonjour, the CPU 203 transmits the TXT record shown in FIG. 12A.

In step S1606, the CPU 203 detects whether it has received an advertisement multicast from the digital camera 100. If the CPU 203 detects advertisement processing in step S902 or S903 of FIG. 9, it advances to step S1607. If NO in step S1606, the CPU 203 continues the processing until it receives the advertisement multicast.

In step S1607, the CPU 203 requests the digital camera to transmit a description.

In step S1608, the CPU 203 receives the description. For UPnP, the CPU 203 receives a description as shown in FIG. 11B from the digital camera 100. For Bonjour, the CPU 203 receives a TXT record as shown in FIG. 12B from the digital camera 100.

In step S1609, the CPU 203 detects whether the digital camera supports the image transfer service. The description describes information representing whether the digital camera supports the image transfer service.

The CPU 203 refers to the tag, and if it detects that the digital camera supports the image transfer service, advances to step S1610. If NO in step S1609, the CPU 203 returns to step S1606 and waits until it receives an advertisement multicast from another PC. As described above, the protocol used in the image transfer service in the embodiment is PTP-IP, and the processing will be explained based on a PTP-IP connection method.

In step S1610, the CPU 203 transmits an InitCommandRequest packet of the PTP-IP protocol to the digital camera 100.

In step S1611, the CPU 203 detects whether it has received an InitAct packet which has been transmitted from the digital camera 100 and represents that the InitCommandRequest packet has been accepted. If the CPU 203 detects that it has received the InitAct packet via the communication device 206, it advances to step S1612; if NO in step S1611, to step S1614.

In step S1612, the CPU 203 transmits an InitEventRequest packet of the PTP-IP protocol to the digital camera 100.

In step S1613, the CPU 203 receives an InitAct packet notifying that the digital camera 100 has normally processed the InitEventRequest packet.

Upon receiving the InitAct packet, the CPU 203 determines that a connection with the digital camera 100 has succeeded, advances to step S603 of FIG. 6, and activates an application which provides the image transfer service.

In step S1614, the CPU 203 detects whether it has received an InitFail packet which has been transmitted from the digital camera 100 and represents that acceptance of the InitCommandRequest packet has been rejected. If the CPU 203 detects that it has received the InitFail packet, it advances to step S1615. If NO in step S1614, the CPU 203 returns to step S1611 and waits for a response to the InitCommandRequest packet from the digital camera 100.

In step S1615, if the CPU 203 receives the InitFail packet in step S1614, it determines that a connection with the digital camera 100 has failed, and displays, on the display unit 201 of the PC 200, a GUI representing that the connection has failed.

In step S1616, the CPU 203 determines whether to end the connection with the digital camera. If the user operates the PC and interrupts the start of the image transfer service on a GUI (not shown), the CPU 203 handles this as a connection failure, and ends the image transfer service. If the CPU 203 waits for a connection with another digital camera, it returns to step S1602 and continues the processing.

Details of the discovery processing in step S602 of FIG. 6 in the PC have been described.

<Other Embodiments>

Although the above embodiment has exemplified a wireless connection in the playback mode, the present invention is not limited to this mode. For example, a wireless connection button may be prepared in the shooting mode or menu mode, and connection processing may proceed when the user presses the button.

In the above embodiment, the digital camera 100, which is an apparatus incorporating the wireless communication function, has been explained as an example of the communication apparatus. However, the present invention is also applicable to a device which can be mounted in another device and provides the wireless communication function. For example, if a recording medium 141 is a recording medium capable of wireless communication, it may control wireless communication. In this case, the same control as that in the above embodiment is performed for the wireless circuit (not shown) of the recording medium 141 capable of wireless communication.

Further, the present invention is also applicable to a system in which a digital camera 100 is remote-controlled from a PC or the like. In this case, the remote control can be implemented by making various inquiries and control requests from the control unit of the PC to a control unit 101 of the digital camera 100.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-265312, filed on Dec. 2, 2011, which is hereby incorporated by reference herein its entirety.

The invention claimed is:

1. A communication apparatus which establishes a connection with a device in a network by using a discovery protocol for discovering the device, comprising:
a communication interface that communicates with a device in a network;
a processor that controls operation of the communication interface; and
wherein the processor:
controls the communication interface to transmit a search command to search devices in the network;
controls the communication interface to receive pieces of device information transmitted from devices in the network in response to the search command;
selects a device based on an instruction via an operation unit of the communication apparatus from among the devices from which the pieces of device information are received;
controls the communication interface to transmit an advertisement signal to advertise to devices in the network of presence of the communication apparatus after the selection of the device;
controls the communication interface to receive a connection request transmitted from a device in the network, the connection request being transmitted by a device which has received the advertisement signal;
determines whether the connection request has been transmitted from the selected device; and
controls the communication interface to transmit a response representing that a connection is accepted in response to the connection request if it is determined that the connection request has been transmitted from the selected device.

2. The apparatus according to claim 1, further comprising a display unit and wherein the processor further controls the display unit to display the pieces of device information, and wherein the instruction is to select information displayed on the display unit.

3. The apparatus according to claim 2, wherein
each piece of the device information contains information of a service provided by the corresponding device, and
the processor controls the display unit to display information of a device which provides a predetermined service.

4. The apparatus according to claim 1, wherein:
the processor registers, as a destination, a device which has an accepted connection after the communication interface transmits the response; and
the processor further selects a device from registered devices while no connection is established with another device,
a device is selected from the registered devices, the processor controls the communication interface to transmit the advertisement signal without transmitting the search command.

5. The apparatus according to claim 1, wherein after the transmission of the response, data communication is performed with the selected device by using a data transfer protocol.

6. The apparatus according to claim 5, wherein the data transfer protocol includes PTP/IP.

7. The apparatus according to claim 1, wherein the device information contains a discovery protocol type.

8. The apparatus according to claim 1, wherein the communication apparatus includes one of an image capture apparatus, a mobile phone, and a tablet device.

9. The apparatus according to claim 1, wherein the device includes one of an image capture apparatus, a mobile phone, a tablet device, a printer, and a TV receiver.

10. The apparatus according to claim 1, wherein the discovery protocol includes one of UPnP and Bonjour.

11. The apparatus according to claim 1, wherein said processor controls the communication interface to transmit a search command based on UPnP and a search command based on Bonjour.

12. A method of controlling a communication apparatus which establishes a connection with a device in a network by using a discovery protocol for discovering the device, the method comprising:

transmitting a search command to search devices in the network;

receiving pieces of device information transmitted from devices in the network in response to the search command;

selecting a device based on an instruction via an operation unit of the communication apparatus from among the devices from which the pieces of device information are received;

transmitting an advertisement signal to advertise to devices in the network of presence of the communication apparatus after the selection of the device;

receiving a connection request transmitted from a device in the network, the connection request being transmitted by a device which has received the advertisement signal;

determining whether the connection request has been transmitted from the selected device; and transmitting a response representing that a connection is accepted in response to the connection request if it is determined that the connection request has been transmitted from the selected device.

13. A non-transitory computer-readable storage medium on which a computer program that causes, when executed, a processor to perform a method of controlling a communication apparatus which establishes a connection with a device in a network by using a discovery protocol for discovering the device, the method comprising:

transmitting a search command to search devices in the network;

receiving pieces of device information transmitted from devices in the network in response to the search command;

selecting a device based on an instruction via an operation unit of the communication apparatus from among the devices from which the pieces of device information are received;

transmitting an advertisement signal to advertise to devices in the network of presence of the communication apparatus after the selection of the device;

receiving a connection request transmitted from a device in the network, the connection request being transmitted by a device which has received the advertisement signal;

determining whether the connection request has been transmitted from the selected device; and transmitting a response representing that a connection is accepted in response to the connection request if it is determined that the connection request has been transmitted from the selected device.

\* \* \* \* \*